United States Patent
Kruck et al.

(10) Patent No.: US 12,485,082 B2
(45) Date of Patent: Dec. 2, 2025

(54) METHOD FOR DYEING KERATIN FIBERS, COMPRISING THE USE OF A DYE CONTAINING AMINO SILICONE AND PIGMENT AND OF A CONDITIONER CONTAINING A CARE AGENT

(71) Applicant: Henkel AG & Co. KGaA, Duesseldorf (DE)

(72) Inventors: Constanze Kruck, Grevenbroich (DE); Gabriele Weser, Essen (DE); Claudia Kolonko, Remscheid (DE); Imme Breuer, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/912,772

(22) Filed: Oct. 11, 2024

(65) Prior Publication Data
US 2025/0041200 A1    Feb. 6, 2025

Related U.S. Application Data

(63) Continuation of application No. PCT/EP2023/050411, filed on Jan. 10, 2023.

(30) Foreign Application Priority Data

Apr. 12, 2022 (DE) .......................... 102022203642.5

(51) Int. Cl.
| | |
|---|---|
| *A61Q 5/10* | (2006.01) |
| *A61K 8/898* | (2006.01) |
| *A61Q 5/06* | (2006.01) |
| *A61Q 5/12* | (2006.01) |

(52) U.S. Cl.
CPC .............. *A61K 8/898* (2013.01); *A61Q 5/065* (2013.01); *A61Q 5/12* (2013.01); *A61K 2800/4324* (2013.01); *A61K 2800/54* (2013.01); *A61K 2800/596* (2013.01); *A61K 2800/884* (2013.01)

(58) Field of Classification Search
CPC . A61Q 5/10; A61Q 5/065; A61Q 5/12; A61K 8/898; A61K 2800/4324; A61K 2800/54; A61K 2800/596; A61K 2800/884; A61K 8/04; A61K 8/06; A61K 8/19; A61K 8/585; A61K 8/86; A61K 8/895
USPC ............................................................ 8/405
See application file for complete search history.

(56) References Cited

FOREIGN PATENT DOCUMENTS

| | | | |
|---|---|---|---|
| DE | 10058328 A1 | 6/2002 | |
| DE | 102019218232 A1 * | 5/2021 | ............. A61K 8/463 |
| DE | 102019218236 A1 * | 5/2021 | ............. A61K 8/898 |
| DE | 102020207605 A1 * | 12/2021 | ............. A61Q 5/10 |
| WO | 2005058259 A1 | 6/2005 | |
| WO | 2012079873 A2 | 6/2012 | |
| WO | 2016133811 A1 | 8/2016 | |
| WO | WO 2021190810 A1 * | 9/2021 | ............. A61Q 5/10 |

OTHER PUBLICATIONS

STIC Search Report dated Jun. 25, 20205.*
PCT International Search Report—WO PCT/EP2023/050411—Completed: Apr. 20, 2023 Mailing date: May 2, 2023—Number of pp. 12.

* cited by examiner

*Primary Examiner* — Eisa B Elhilo
(74) *Attorney, Agent, or Firm* — P. Scott Smith

(57) ABSTRACT

The present invention relates to a method for coloring keratin fibers, and in particular human hair. The method includes the steps of applying a coloring agent (F) to the keratin fibers and applying a conditioner (C) to the keratin fibers. The coloring agent (F) can includes (f1) at least one amino-functionalized silicone polymer and (f2) at least one pigment. The conditioner (c) can include (ci) at least one care substance selected from esterquat surfactants, amidoamine surfactants, quaternary imidazoline surfactants, homopolymers of diallyldimethyl ammonium chloride, copolymers of diallyldimethyl ammonium chloride, quaternized cellulose derivatives, chitosan, and derivatives of chitosan.

20 Claims, No Drawings

METHOD FOR DYEING KERATIN FIBERS, COMPRISING THE USE OF A DYE CONTAINING AMINO SILICONE AND PIGMENT AND OF A CONDITIONER CONTAINING A CARE AGENT

FIELD OF INVENTION

The subject matter of the present application is a method for coloring keratin fibers, and in particular human hair, which comprises the application of a coloring agent (F) and the application of a conditioner (C). In this case, the coloring agent (F) contains at least one amino-functionalized silicone polymer (f1) and at least one pigment (f2). The conditioner (C) contains at least one care substance from a specific group.

BACKGROUND

Changing the shape and color of keratin fibers, and in particular human hair, represents an important field of modern cosmetics. To change the hair color, the skilled artisan is familiar with a variety of coloring systems depending upon the coloring requirements. Oxidation coloring agents are typically used for permanent, intense coloring with good fastness properties and good gray coverage. Such coloring agents contain oxidation dye precursors, what are known as developer components and coupler components, which together form the actual dyes under the influence of oxidizing agents such as, for example, hydrogen peroxide. Oxidation coloring agents are characterized by very long-lasting color results.

When using direct dyes, dyes which are already formed diffuse out of the coloring agent into the hair fiber. In comparison with oxidative hair coloring, the colors obtained with direct dyes have a lower durability and a more rapid washing out. Colors with direct dyes usually remain on the hair for a period of between 5 and 20 hair washes.

The use of color pigments for brief changes in color on the hair and/or the skin is known. Pigments or color pigments are generally understood to mean insoluble coloring substances. These are present undissolved in the form of small particles in the coloring formulation and are only deposited from the outside onto the hair fibers and/or the skin surface. They can therefore generally be removed again without leaving residue by washing a few times with surfactant-containing cleaning agents. Various products of this type by the name of hair mascara are available on the market.

If the user desires particularly long-lasting coloring, the use of oxidative coloring agents has hitherto been the only option. However, despite multiple optimization attempts, an unpleasant ammonia odor or amine odor cannot be completely avoided in oxidative hair coloring. The hair damage that remains associated with the use of the oxidative coloring agents also has a disadvantageous effect on the hair of the user. The search for alternative, high-performance coloring methods is therefore an ongoing challenge. One possible alternative coloring system, which recently has been moving increasingly into focus, is based upon the use of colored pigments.

Coloring with pigments offers various major advantages. Since the pigments are deposited only from the outside to the keratin fibers, and in particular to the hair fibers, the damage associated with the dyeing process is very particularly low. Furthermore, desired colorings that are no longer desired can be removed quickly and easily without residue and therefore offer the user the possibility of returning directly and without great effort to their original hair color. This coloring process is therefore particularly attractive for consumers who do not regularly want to re-color their hair.

SUMMARY OF THE INVENTION

In current works, the problem of the low durability of this coloring system has been addressed. In this context, it was found that the wash-fastness of the coloring results obtained with pigments could be greatly improved by combining the pigments with certain amino-functionalized silicone polymers. In addition, the choice of particularly well-suited pigments and pigment concentrations on dark hair achieved a brighter color result so that lightening was even possible with this coloring system, which was possible until now only with oxidative hair treatment agents (bleaching or decolorizing agents).

In addition to these many advantages, however, the coloring system based upon pigments still has some disadvantages. Since both the pigments and the aminosilicones which immobilize the pigments are deposited on the surface of the hair fibers, their surface structure is modified by the formation of a film. Depending upon the thickness of the formed film, this modification may also be associated with a change in the haptic impression of the hair fibers, ranging from a feeling of having heavier or greasy hair to a rough, shaggy, or straw-like feel to the hair.

It was the object of the present invention to provide a coloring system based upon pigments which allows intense color results with good hair feel. A technique has been sought that makes it possible to fix colored pigments to the hair as permanently as possible without the hair feeling heavy, greasy, unnatural, straw-like, coated, or sticky. A particular focus of the object was to achieve intense color results with good hair feel at the same time.

Surprisingly, it has now been found that keratin fibers which have been colored by application of a coloring agent with aminosilicone and pigment in a first step experience an improvement in terms of their hair feel in particular if they are treated in the subsequent step with a conditioner which contains at least one special care substance selected from the group consisting of esterquat surfactants, amidoamine surfactants, quaternary imidazoline surfactants, homo- or co-polymers of diallyldimethyl ammonium chloride, quaternized cellulose derivatives, chitosan, and derivatives of chitosan. The coloring agent and the conditioner are successively applied to the keratin fibers and represent various formulations.

DETAILED DESCRIPTION OF THE INVENTION

The present invention firstly relates to a method for coloring keratin fibers, and in particular human hair, comprising
(1) applying a coloring agent (F) to the keratin fibers which contains
  (f1) at least one amino-functionalized silicone polymer and
  (f2) at least one pigment, and
(2) applying a conditioner (C) to the keratin fibers which contains
  (c1) at least one care substance selected from the group consisting of esterquat surfactants, amidoamine surfactants, quaternary imidazoline surfactants, homopolymers of diallyldimethyl ammonium chloride, copolymers of diallyldimethyl ammonium chloride, quaternized cellulose derivatives, chitosan, and derivatives of chitosan, wherein the coloring agent (F) and the conditioner (C) are various formulations.

The work leading to this invention has shown that hair could be intensely colored by applying coloring agents (F) containing the aminosilicone (f1) and pigment (f2). The hair feel of the hair colored in this way could be massively improved if, after the coloring, a conditioner (C) containing at least one care substance of the above-mentioned special group was applied to the keratin fibers. In particular, it was surprising here that the presence of one or more care substances from this group in the conditioner made it possible to improve the hair feel without losses in terms of color intensity.

Keratin Fibers

Keratin fibers are understood to be wool, fur, and feathers, and in particular human hair. Keratin fibers are very particularly preferably understood to mean human hair.

Coloring Agent

In the context of this invention, the term, "coloring agent," is used for a coloring of the keratin material, and in particular hair, brought about by use of pigments. In this coloring process, the pigments are deposited as coloring compounds together with the amino-functionalized silicone polymer(s) in a particularly homogeneous, uniform, and smooth film on the surface of the keratin material.

Improving the Tactile Sensation

An improvement in the tactile sensation is understood to mean that the dyed keratin fibers, and in particular human hair, give a more natural and softer impression when the hair is touched, and that the dyed keratin fibers or the dyed hairs feel less heavy, greasy, oily, unnatural, straw-like, rough, or coated. Individual hair fibers can also be separated from one another better and do not stick together.

The tactile sensation is a sensory impression which can be felt, for example, by trained persons such as hairdressers. The improvement in the tactile sensation of a strand of hair can be determined, for example, by a hairdresser or also by an experienced user by feeling or touching two different strands and therefore determining by comparison which of the two strands feels better, i.e., which of the two strands makes a less greasy, oily, sticky, coated, rough, or straw-like impression.

Application of the Coloring Agent (F) to Keratin Fibers

In step (1) of the coloring method according to the invention, a coloring agent (F) is applied to the keratin fibers or to the human hair which contains at least one amino-functionalized silicone polymer (f1) and at least one pigment (f2). The coloring agent (F) is a ready-to-use coloring agent.

Amino-Functionalized Silicone Polymer (f1) in the Coloring Agent

The coloring agent (F) contains at least one amino-functionalized silicone polymer (f1). The amino-functionalized silicone polymer can alternatively also be referred to as aminosilicone or amodimethicone.

Silicone polymers are generally macromolecules with a molecular weight of at least 500 g/mol, preferably at least 1,000 g/mol, more preferably at least 2,500 g/mol, and particularly preferably at least 5,000 g/mol, and comprise repeating organic units.

The maximum molecular weight of the silicone polymer depends upon the degree of polymerization (number of polymerized monomers) and the batch size, and is also determined by the polymerization method. In the context of the present invention, it is preferable if the maximum molecular weight of the silicone polymers is not more than $10^7$ g/mol, preferably not more than $10^6$ g/mol, and particularly preferably not more than $10^5$ g/mol.

The silicone polymers comprise many Si—O repeat units, the Si atoms being able to bear organic groups such as, for example, alkyl groups or substituted alkyl groups. Alternatively, a silicone polymer is therefore also referred to as polydimethylsiloxane.

Corresponding to the high molecular weight of the silicone polymers, these are based upon more than 10 Si—O repeat units, preferably more than 50 Si—O repeat units and particularly preferably more than 100 Si—O repeat units, and very particularly preferably more than 500 Si—O units.

An amino-functionalized silicone polymer is understood to mean a functionalized silicone which bears at least one structural unit with an amino group. The amino-functionalized silicone polymer preferably bears several structural units with at least one amino group in each instance. An amino group is understood to mean a primary amino group, a secondary amino group, and a tertiary amino group. All these amino groups can be protonated in an acidic environment and are then present in their cationic form.

In principle, a good coloring performance with amino-functionalized silicone polymers were achieved if these bear at least one primary, at least one secondary, and/or at least one tertiary amino group. However, intense colorings with the best colorfastness were obtained when an amino-functionalized silicone polymer containing at least one secondary amino group was used in the agent.

In a very particularly preferred embodiment, a method according to the invention is characterized in that a coloring agent (F) is applied to the keratin fibers which comprises at least one amino-functionalized silicone polymer (f1) having at least one secondary amino group.

The secondary amino groups(s) may be at different positions of the amino-functionalized silicone polymer. Very particularly good color results were obtained when an amino-functionalized silicone polymer was used that had at least one, and preferably several structural units of the formula (Si-amino).

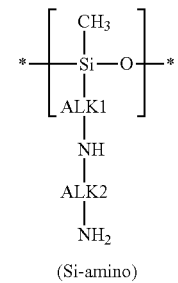

(Si-amino)

In the structural units of the formula (Si-amino), the abbreviations ALK1 and ALK2 are each independently a linear or branched, divalent $C_1$-$C_{20}$ alkylene group.

In a further very particularly preferred embodiment, a method according to the invention is characterized in that the coloring agent (F) contains at least one amino-functionalized silicone polymer (f1) which comprises at least one structural unit of formula (Si-amino),

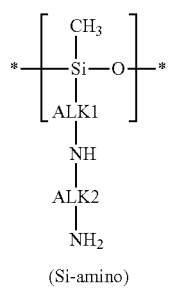

(Si-amino)

where

ALK1 and ALK2 represent, independently of one another, a linear or branched, divalent $C_1$-$C_{20}$ alkylene group.

The positions marked with an asterisk (*) in each case indicate the bond to further structural units of the silicone polymer. For example, the silicon atom adjacent to the asterisk can be bonded to an additional oxygen atom, and the oxygen atom adjacent to the asterisk can be bonded to an additional silicon atom or else to a $C_1$-$C_6$ alkyl group.

A divalent $C_1$-$C_{20}$ alkylene group can alternatively also be termed a double-bond $C_1$-$C_{20}$ alkylene group, which means that each moiety ALK1 or ALK2 can have two bonds.

In the case of ALK1, the silicon atom is bonded to the moiety ALK1, and the second bond is between ALK1 and the secondary amino group.

In the case of ALK2, the secondary amino group bonds with the moiety ALK2, and the second bond is formed between ALK2 and the primary amino group.

Examples of a linear divalent $C_1$-$C_{20}$ alkylene group are, for example, the methylene group (—$CH_2$—), the ethylene group (—$CH_2$—$CH_2$—), the propylene group (—$CH_2$—$CH_2$—$CH_2$—), and the butylene group (—$CH_2$—$CH_2$—$CH_2$—$CH_2$—). The propylene group (—$CH_2$—$CH_2$—$CH_2$—) is particularly preferred. Starting at a chain length of 3 C atoms, divalent alkylene groups may also be branched. Examples of branched, divalent $C_3$-$C_{20}$ alkylene groups are (—$CH_2$—$CH(CH_3)$—) and (—$CH_2$—$CH(CH_3)$—$CH_2$—).

In a further particularly preferred embodiment, the structural units of the formula (Si-amino) represent repeat units in the amino-functionalized silicone polymer, so that the silicone polymer comprises several structural units of the formula (Si-amino).

In the following, particularly well-suited amino-functionalized silicone polymers with at least one secondary amino group are listed.

Colorings with the best wash-fastness could be obtained if at least one agent containing at least one amino-functionalized silicone polymer comprising structural units of formula (Si-I) and formula (Si-II) were applied to the keratinous material during the coloring:

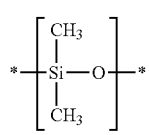

(Si-I)

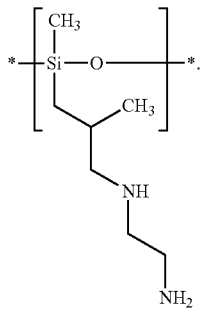

(Si-II)

In a further explicitly very particularly preferred embodiment, a method according to the invention is characterized in that the coloring agent (F) contains at least one amino-functionalized silicone polymer (f1) which comprises structural units of formula (Si-I) and formula (Si-II):

(Si-I)

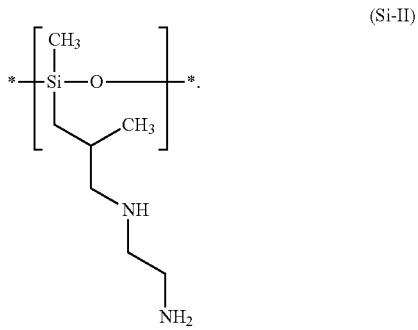

(Si-II)

A corresponding amino-functionalized silicone polymer with the structural units (Si-I) and (Si-II) is, for example, the commercial product, DC 2-8566 or Dowsil 2-8566 Amino Fluid which is sold commercially by Dow Chemical Company and which bears the designation, "Siloxanes and Silicones, 3-[(2-Aminoethyl)amino]-2-methylpropyl Me, Di-Me-Siloxane" and the CAS number 106842-44-8. A further particularly preferred commercial product is Dowsil AP-8568 Amino Fluid, which is likewise sold commercially by Dow Chemical Company.

In the context of a further embodiment, the coloring can also be carried out by applying a coloring agent (F) which contains at least one amino-functional silicone polymer of formula (Si-III),

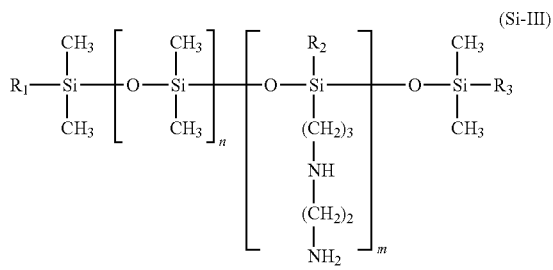

(Si-III)

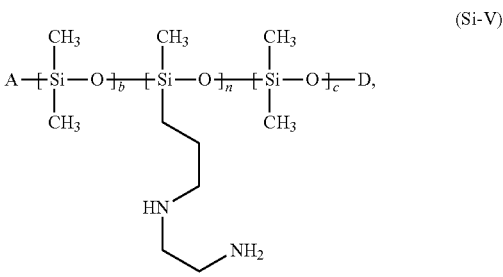

(Si-V)

where m and n denote numbers that are selected such that the sum (n+m) is in a range of 1 to 1,000, n is a number in a range of 0 to 999, and m is a number in a range of 1 to 1,000, R1, R2, and R3, which are identical or different, denote a hydroxyl group or a C1-4 alkoxy group, at least one of the R1 through R3 groups denotes a hydroxyl group.

Further suitable methods are characterized by the application of a coloring agent to the keratin fibers, wherein the coloring agent contains at least amino-functional silicone polymer of formula (Si-IV),

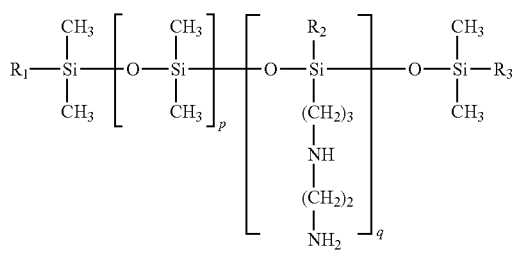

(Si-IV)

where p and q denote numbers that are selected such that the sum (p+q) is in a range of 1 to 1,000, p is a number in a range of 0 to 999, and q is a number in a range of 1 to 1,000, and R1 and R2, which are different, denote a hydroxyl group or a C1-4 alkoxy group, where at least one of the groups R1 through R2 denotes a hydroxyl group.

The silicones of the formulas (Si-III) and (Si-IV) differ by the grouping on the Si atom that carries the nitrogen-containing group: In formula (Si-III), R2 denotes a hydroxyl group or a C1-4 alkoxy group, whereas the group in formula (Si-IV) is a methyl group. The individual Si moieties, which are labeled with the indices m and n or p and q, need not be present as blocks; instead, the individual units can also be distributed randomly, i.e., in the formulas (Si-III) and (Si-IV), each R1-Si(CH$_3$)$_2$ group is not necessarily bound to a —[O—Si(CH$_3$)$_2$] moiety.

Methods according to the invention in which a coloring agent containing at least one amino-functional silicone polymer of formula (Si-V) is applied to the keratin fibers have also proven to be particularly effective with regard to the generation of intense color results:

where

A represents an —OH, —O—Si(CH$_3$)$_3$, —O—Si(CH$_3$)$_2$OH, or —O—Si(CH$_3$)$_2$OCH$_3$ group, D represents an —H, —Si(CH$_3$)$_3$, —Si(CH$_3$)$_2$OH, or —Si(CH$_3$)$_2$OCH$_3$ group, b, n, and c stand for integers between 0 and 1,000, with the proviso that n>0 and b+c>0 at least one of the conditions A=—OH or D=—H is met.

In the aforementioned formula (Si-V), the individual siloxane units having the indices b, c, and n are randomly distributed, i.e., they are not necessarily block copolymers.

The applied coloring agent can also contain one or more different amino-functionalized silicone polymers which are described by the formula (Si-VI):

$$M(R_aQ_bSiO_{(4-a-b)/2})_x(R_cSiO_{(4-c)/2})_yM. \quad \text{(Si-VI)}$$

In the above formula, R is a hydrocarbon or a hydrocarbon group having 1 to approximately 6 carbon atoms, Q is a polar group of general formula —R$^1$HZ, in which R$^1$ is a bivalent linking group bonded to hydrogen and the group Z, composed of carbon and hydrogen atoms, carbon, hydrogen, and oxygen atoms, or carbon, hydrogen, and nitrogen atoms, and Z is an organic, amino-functional group containing at least one amino-functional group; "a" assumes values in a range of approximately 0 to approximately 2, "b" assumes values in a range of approximately 1 to approximately 3, "a"+"b" is less than or equal to 3, and "c" is a number in a range of approximately 1 to approximately 3, and x is a number in a range of 1 to approximately 2,000, preferably approximately 3 to approximately 50, and most preferably approximately 3 to approximately 25, and y is a number in a range of approximately 20 to approximately 10,000, preferably approximately 125 to approximately 10,000, and most preferably approximately 150 to approximately 1,000, and M is a suitable silicone end group as is known in the prior art, preferably trimethylsiloxy. Non-limiting examples of the functional groups represented by R include alkyl functional groups, such as methyl, ethyl, propyl, isopropyl, isopropyl, butyl, isobutyl, amyl, isoamyl, hexyl, isohexyl, and the like; alkenyl functional groups such as vinyl, halovinyl, alkylvinyl, allyl, haloallyl, and alkylallyl; cycloalkyl functional groups such as cyclobutyl, cyclopentyl, cyclohexyl, and the like; phenyl functional groups; benzyl functional groups; halohydrocarbon functional groups such as 3-chloropropyl, 4-bromobutyl, 3,3,3-trifluoropropyl, chlorocyclohexyl, bromophenyl, chlorophenyl, and the like; and sulfur-containing functional groups such as mercaptoethyl, mercaptopropyl, mercaptohexyl, mercaptophenyl, and the like; R is preferably an alkyl functional group containing 1 to approximately 6 carbon atoms, and most preferably R is methyl. Examples of $R^1$ include methylene, ethylene, propylene, hexamethylene, decamethylene, —$CH_2CH(CH_3)$ $CH_2$—, phenylene, naphthylene, —$CH_2CH_2SCH_2CH_2$—, —$CH_2CH_2OCH_2$—, —$OCH_2CH_2$—, —$OCH_2CH_2CH_2$—, —$CH_2CH(CH_3)C(O)OCH_2$—, —$(CH_2)_3$ $CC(O)$ $OCH_2CH_2$—, —$C_6H_4C_6H_4$—, —$C_6H_4CH_2C_6H_4$—; and —$(CH_2)_3C(O)SCH_2CH_2$—.

Z is an organic, amino-functional group containing at least one functional amino group. A possible formula for Z is $NH(CH_2)_2NH_2$, where z is 1 or more. Another possible formula for Z is —$NH(CH_2)_z(CH_2)_{zz}NH$, in which both z and zz are independently 1 or more, this structure comprising diamino ring structures, such as piperazinyl. Z is most preferably a —$NHCH_2CH_2NH_2$ functional group. Another possible formula for Z is $N(CH_2)_z(CH_2)_{zz}NX_2$ or —$NX_2$, where each X of $X_2$ is selected independently from the group consisting of hydrogen and alkyl groups having 1 to 12 carbon atoms, and zz is 0.

Q is most preferably a polar, amino-functional group of formula —$CH_2CH_2CH_2NHCH_2CH_2NH_2$. In the formulas, "a" assumes values in the range of about 0 to about 2, "b" assumes values in the range of about 2 to about 3, "a"+"b" is less than or equal to 3, and "c" is a number in the range of about 1 to about 3. The molar ratio of the $R_aQ_bSiO_{(4-a-b)/2}$ units to the $R_cSiO_{(4-c)/2}$ units lies within a range of about 1:2 to 1:65, preferably about 1:5 to about 1:65, and most preferably about 1:15 to about 1:20. If one or more silicones of the above formula are used, then the various variable substituents in the above formula can be different in the various silicone components, present in the silicone mixture.

In the context of a further embodiment, a method according to the invention is characterized by the application of a coloring agent to the keratin fibers, wherein the coloring agent contains an amino-functional silicone polymer of formula (Si-VII)

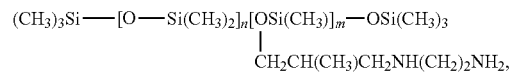
(Si-VII)

in which:
G is —H, a phenyl group, —OH, —O—$CH_3$, —$CH_3$, —O—$CH_2CH_3$, —$CH_2CH_3$, —O—$CH_2CH_2CH_3$, —$CH_2CH_2CH_3$, —O—$CH(CH_3)_2$, —$CH(CH_3)_2$, —O—$CH_2CH_2CH_2CH_3$, —$CH_2CH_2CH_2CH_3$, —O—$CH_2CH(CH_3)_2$, —$CH_2CH(CH_3)_2$, —O—CH $(CH_3)CH_2CH_3$, —$CH(CH_3)CH_2CH_3$, —O—C $(CH_3)_3$, or —$C(CH_3)_3$;
a represents a number between 0 and 3, and in particular 0;
b represents a number between 0 and 1, and in particular 1;
m and n are numbers whose sum (m+n) is between 1 and 2,000, and preferably between 50 and 150, n preferably assuming values of 0 to 1,999 and in particular 49 to 149, and m preferably assuming values of 1 to 2,000, and in particular 1 to 10;
R' is a monovalent functional group selected from:
-Q-N(R")—$CH_2$—$CH_2$—N(R")$_2$
-Q-N(R")$_2$
-Q-N+(R")$_3$A$^-$
-Q-N+H(R")$_2$A$^-$
-Q-N+H$_2$(R")A$^-$
-Q-N(R")—$CH_2$—$CH_2$—N+R"H$_2$A$^-$, each Q representing a chemical bond, —$CH_2$—, —$CH_2$—$CH_2$—, —$CH_2CH_2CH_2$—, —$C(CH_3)_2$—, —$CH_2CH_2CH_2CH_2$—, —$CH_2C(CH_3)_2$—, or —CH $(CH_3)CH_2CH_2$—, R" representing identical or different functional groups from the group —H, -phenyl, -benzyl, —$CH_2$—$CH(CH_3)Ph$, from the $C_{1-20}$ alkyl groups, preferably —$CH_3$, —$CH_2CH_3$, —$CH_2CH_2CH_3$, —$CH(CH_3)_2$, —$CH_2CH_2CH_3$, —$CH_2CH(CH_3)_2$, —$CH(CH_3)CH_2CH_3$, —$C(CH_3)_3$, and A representing an anion preferably selected from chloride, bromide, iodide, or methosulfate.

In the context of a further embodiment, a method according to the invention is characterized by the application of a coloring agent to the keratin fibers, wherein the coloring agent contains at least one amino-functional silicone polymer of formula (Si-VIIa),

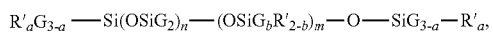
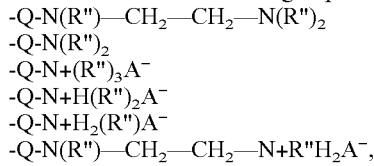
(Si-VIIa)

in which m and n are numbers of which the sum (m+n) is between 1 and 2,000, and preferably between 50 and 150, n preferably assuming values of 0 to 1,999 and in particular 49 to 149, and m preferably assuming values of 1 to 2,000, and in particular 1 to 10.

These silicones are designated as trimethylsilylamodimethicones in accordance with the INCI Declaration.

In the context of a further preferred embodiment, a method according to the invention is characterized by the application of a coloring agent to the keratinous fibers, wherein the coloring agent contains at least one amino-functional silicone polymer of formula (Si-VIIb)

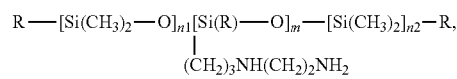
(Si-VIIb)

in which R denotes —OH, —O—$CH_3$, or a —$CH_3$ group, and m, n1, and n2 are numbers whose sum (m+n1+n2) amounts to between 1 and 2,000, and preferably between 50 and 150, the sum (n1+n2) preferably assuming values from 0 to 1,999, and in particular 49 to 149, and m preferably assuming values from 1 to 2,000, and in particular 1 to 10.

According to the INCI Declaration, these amino-functionalized silicone polymers are referred to as amodimethicones.

Irrespective of which amino-functional silicones are used, coloring agents according to the invention that contain an amino-functional silicone whose amine value is above 0.25 meq/g, preferably above 0.3 meq/g, and in particular above 0.4 meq/g are preferred. The amine value here represents the milliequivalents of amine per gram of the amino-functional silicone. Said value can be determined by titration and may also be given in the unit, mg KOH/g.

Furthermore, coloring agents which contained a specific 4-morpholinomethyl-substituted silicone polymer are also suitable for use in the method according to the invention. This amino-functionalized silicone polymer comprises structural units of formulas (Si-VIII) and of the formula (Si-IX):

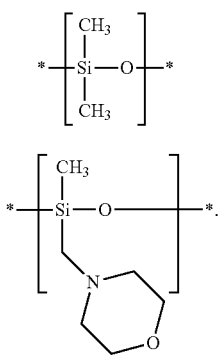

(Si-VIII)

(Si-IX)

Corresponding 4-morpholinomethyl-substituted silicone polymers are described below.

A corresponding amino-functionalized silicone polymer is known under the name, amodimethicone/morpholinomethyl silsesquioxane copolymer, and is commercially available in the form of the raw material, Belsil ADM 8301 E, from Wacker.

For example, a silicone which has structural units of formulas (Si-VIII), (Si-IX), and (Si-X) can be used as 4-morpholinomethyl-substituted silicone:

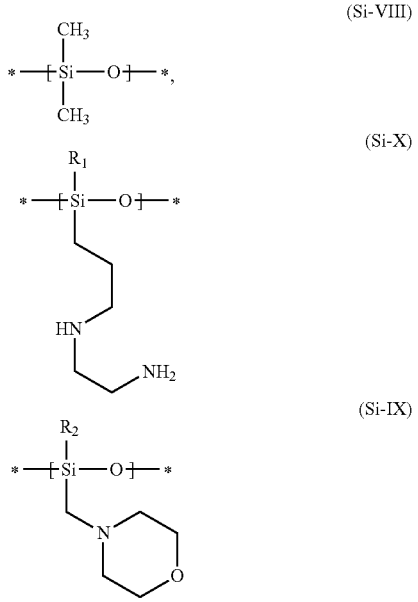

(Si-VIII)

(Si-X)

(Si-IX)

in which
R1 represents —CH$_3$, —OH, —OCH$_3$, —O—CH$_2$CH$_3$, —O—CH$_2$CH$_2$CH$_3$, or —O—CH(CH$_3$)$_2$;
R2 represents —CH$_3$, —OH, or —OCH$_3$.

Particularly preferred coloring agents contain at least one 4-morpholinomethyl-substituted silicone of formula (Si-XI)

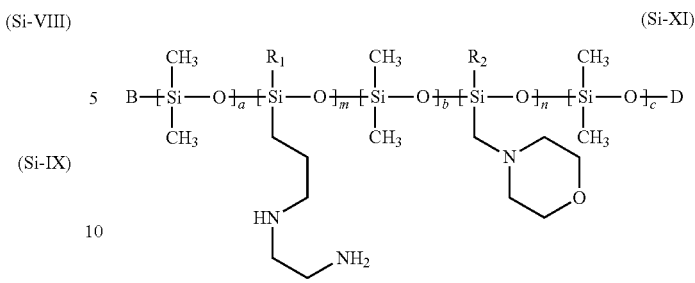

(Si-XI)

where
R1 represents —CH$_3$, —OH, —OCH$_3$, —O—CH$_2$CH$_3$, —O—CH$_2$CH$_2$CH$_3$, or —O—CH(CH$_3$)$_2$;
R2 represents —CH$_3$, —OH, or —OCH$_3$.
B represents an —OH, —O—Si(CH$_3$)$_3$, —O—Si(CH$_3$)$_2$OH, or —O—Si(CH$_3$)$_2$OCH$_3$ group,
D represents an —H, —Si(CH$_3$)$_3$, —Si(CH$_3$)$_2$OH, or —Si(CH$_3$)$_2$OCH$_3$ group,
a, b, and c represent, independently of one another, integers between 0 and 1,000, with the proviso that a+b+c>0
m and n represent, independently of one another, integers between 1 and 1,000, with the proviso that
at least one of the conditions B=—OH or D=—H is met,
the units a, b, c, m, and n are distributed randomly or in blocks in the molecule.

Structural formula (Si-XI) is intended to indicate that the siloxane groups n and m do not necessarily have to be directly bonded to an end group B or D. Instead, in preferred formulas (Si-VI), a>0 or b>0 and, in particularly preferred formulas (Si-VI), a>0 and c>0; i.e., the terminal grouping B or D is preferably bonded to a dimethylsiloxy grouping. In formula (Si-VI) as well, the siloxane units a, b, c, m, and n are preferably distributed randomly.

The silicones represented by formula (Si-VI) and used according to the invention can be trimethylsilyl-terminated (D or B=—Si(CH$_3$)$_3$), but they may also be dimethylsilylhydroxy-terminated at both ends or dimethylsilylhydroxy- and dimethylsilylmethoxy-terminated at one end. In the context of the present invention, silicones which are particularly preferably used are selected from silicones in which:
B=—O—Si(CH$_3$)$_2$OH and D=—Si(CH$_3$)$_3$
B=—O—Si(CH$_3$)$_2$OH and D=—Si(CH$_3$)$_2$OH
B=—O—Si(CH$_3$)$_2$OH and D=—Si(CH$_3$)$_2$OCH$_3$
B=—O—Si(CH$_3$)$_3$ and D=—Si(CH$_3$)$_2$OH
B=—O—Si(CH$_3$)$_2$OCH$_3$ and D=—Si(CH$_3$)$_2$OH.

These silicones lead to enormous improvements in the hair properties of hair treated with the agents according to the invention, and to greatly improved protection during oxidative treatment.

The coloring agents used in the coloring step can contain one or more amino-functionalized silicone polymers for example in a total amount of 0.1 to 8.0 wt %, preferably 0.2 to 5.0 wt %, more preferably 0.3 to 3.0 wt %, and very particularly preferably 0.4 to 2.5 wt %. Here, the indicated amounts relate to the total amount of all aminosilicones used, which is set in relation to the total weight of the coloring agent.

In the context of another particularly preferred embodiment, a method according to the present invention is characterized in that the coloring agent (F)—relative to the total weight of the coloring agent (F)—contains one or more amino-functionalized silicone polymers (f1) in a total amount of 0.1 to 20 wt %, preferably 0.2 to 10 wt %, more preferably 0.3 to 5 wt %, still more preferably 0.4 to 3.5 wt %, and very particularly preferably 0.5 to 2.0 wt %.

Pigments (f2) in the Coloring Agent (F)

As a second essential component, the coloring agent (F) applied in step (1) of the method according to the invention contains at least one pigment (f2).

Pigments in the sense of the present invention are understood to mean coloring compounds which have a solubility of less than 0.5 g/L, preferably of less than 0.1 g/L, and even more preferably of less than 0.05 g/L at 25° C. in water. The water solubility can be determined, for example, by means of the method described below: 0.5 g of the pigment is weighed into a beaker. A stir bar is added. Then, one liter of distilled water is added. This mixture is heated to 25° C. while stirring with a magnetic stirrer for one hour. If still undissolved components of the pigment are visible in the mixture after this period, the solubility of the pigment is below 0.5 g/L. If the pigment-water mixture cannot be visually assessed due to the high intensity of the pigment that may be finely dispersed, the mixture is filtered. If a portion of undissolved pigments remains on the filter paper, the solubility of the pigment is below 0.5 g/L.

Suitable dye pigments may be of inorganic and/or organic origin. In a preferred embodiment, a method according to the invention is characterized in that the post-treatment agent is applied to keratin material which has been colored by application of at least one inorganic and/or organic pigment.

Preferred color pigments are selected from synthetic or natural inorganic pigments. Inorganic color pigments of natural origin can be produced, for example, from chalk, ocher, umbra, green soil, burnt Sienna, or graphite. Furthermore, black pigments such as, for example, iron oxide black, chromatic pigments such as, for example, ultramarine or iron oxide red, and also fluorescent or phosphorescent pigments, can be used as inorganic color pigments.

Colored metal oxides, hydroxides and oxide hydrates, mixed phase pigments, sulfur-containing silicates, silicates, metal sulfides, complex metal cyanides, metal sulfates, chromates, and/or molybdates are particularly suitable. Particularly preferred color pigments are black iron oxide (CI 77499), yellow iron oxide (CI 77492), red and brown iron oxide (CI77491), manganese violet (CI77742), ultramarine (sodium aluminum sulphosilicates, CI 77007, Pigment Blue 29), chromium oxide hydrate (CI77289), Iron Blue (ferric ferrocyanide, CI77510), and/or carmine (cochineal).

Color pigments which are likewise particularly preferred according to the invention are colored pearlescent pigments. These are usually based upon mica and may be coated with one or more metal oxides. Mica is a phyllosilicate. The most important representatives of these silicates are muscovite, phlogopite, paragonite, biotite, lepidolite, and margarite. In order to produce the pearlescing pigments in conjunction with metal oxides, mica—primarily muscovite or phlogopite—is coated with a metal oxide.

As an alternative to natural mica, synthetic mica coated with one or more metal oxides(s) can also be used as a pearlescent pigment. Particularly preferred pearlescent pigments are based upon natural or synthetic mica and are coated with one or more of the aforementioned metal oxides. The color of the respective pigments can be varied by varying the layer thickness of the metal oxide(s).

In another preferred embodiment, a method according to the invention is characterized in that the coloring agent (F) contains at least one inorganic pigment (f2), wherein the inorganic pigment is preferably selected from the group consisting of colored metal oxides, metal hydroxides, metal oxide hydrates, silicates, metal sulfides, complex metal cyanides, metal sulfates, bronze pigments, and/or from mica-based colored pigments which are coated with at least one metal oxide and/or a metal oxychloride.

In another preferred embodiment, a method according to the invention is characterized in that the coloring agent (F) contains at least one pigment (f2) selected from mica-based colored pigments which are coated with one or more metal oxides from the group of titanium dioxide (CI 77891), black iron oxide (CI 77499), yellow iron oxide (CI 77492), red and/or brown iron oxide (CI 77491, CI 77499), manganese violet (CI 77742), ultramarine (sodium aluminum sulfosilicates, CI 77007, Pigment Blue 29), chromium oxide hydrate (CI 77289), chromium oxide (CI 77288), and/or iron blue (ferric ferrocyanide, CI 77510).

Examples of particularly suitable color pigments are commercially available, for example, under the trade names, Rona®, Colorona®, Xirona®, Dichrona® and Timiron® from the company Merck, Ariabel® and Unipure® from the company Sensient, Prestige® from the company Eckart Cosmetic Colors, and Sunshine® from the company Sunstar.

Very particularly preferred color pigments with the trade name, Colorona®, are, for example:
Colorona Copper, Merck, MICA, CI 77491 (IRON OXIDES)
Colorona Passion Orange, Merck, Mica, CI 77491 (IRON OXIDES), Alumina
Colorona Patina Silver, Merck, MICA, CI77499 (IRON OXIDES), CI 77891 (TITANIUM DIOXIDE)
Colorona RY, Merck, CI 77891 (TITANIUM DIOXIDE), MICA, CI 75470 (CARMINE)
Colorona Oriental Beige, Merck, MICA, CI 77891 (TITANIUM DIOXIDE), CI 77491 (IRON OXIDES)
Colorona Dark Blue, Merck, MICA, TITANIUM DIOXIDE, FERRIC FERROCYANIDE
Colorona Chameleon, Merck, CI 77491 (IRON OXIDES), MICA
Colorona Aborigine Amber, Merck, MICA, CI 77499 (IRON OXIDES), CI 77891 (TITANIUM DIOXIDE)
Colorona Blackstar Blue, Merck, CI 77499 (IRON OXIDES), MICA
Colorona Patagonian Purple, Merck, MICA, CI 77491 (IRON OXIDES), CI 77891 (TITANIUM DIOXIDE), CI 77510 (FERRIC FERROCYANIDE)
Colorona Red Brown, Merck, MICA, CI 77491 (IRON OXIDES), CI 77891 (TITANIUM DIOXIDE)
Colorona Russet, Merck, CI 77491 (TITANIUM DIOXIDE), MICA, CI 77891 (IRON OXIDES)
Colorona Imperial Red, Merck, MICA, TITANIUM DIOXIDE (CI 77891), D&C RED NO. 30 (CI 73360)
Colorona Majestic Green, Merck, CI 77891 (TITANIUM DIOXIDE), MICA, CI 77288 (CHROMIUM OXIDE GREENS)
Colorona Light Blue, Merck, MICA, TITANIUM DIOXIDE (CI 77891), FERRIC FERROCYANIDE (CI 77510)
Colorona Red Gold, Merck, MICA, CI 77891 (TITANIUM DIOXIDE), CI 77491 (IRON OXIDES)
Colorona Gold Plus MP 25, Merck, MICA, TITANIUM DIOXIDE (CI 77891), IRON OXIDES (CI 77491)
Colorona Carmine Red, Merck, MICA, TITANIUM DIOXIDE, CARMINE
Colorona Blackstar Green, Merck, MICA, CI 77499 (IRON OXIDES)

Colorona Bordeaux, Merck, MICA, CI 77491 (IRON OXIDES)
Colorona Bronze, Merck, MICA, CI 77491 (IRON OXIDES)
Colorona Bronze Fine, Merck, MICA, CI 77491 (IRON OXIDES)
Colorona Fine Gold MP 20, Merck, MICA, CI 77891 (TITANIUM DIOXIDE), CI 77491 (IRON OXIDES)
Colorona Sienna Fine, Merck, CI 77491 (IRON OXIDES), MICA
Colorona Sienna, Merck, MICA, CI 77491 (IRON OXIDES)
Colorona Precious Gold, Merck, Mica, CI 77891 (Titanium dioxide), Silica, CI 77491 (IRON OXIDES), Tin oxide
Colorona Sun Gold Sparkle MP 29, Merck, MICA, TITANIUM DIOXIDE, IRON OXIDES, MICA, CI 77891, CI 77491 (EU)
Colorona Mica Black, Merck, CI 77499 (Iron oxides), Mica, CI 77891 (Titanium dioxide)
Colorona Bright Gold, Merck, Mica, CI 77891 (Titanium dioxide), CI 77491 (Iron oxides)
Colorona Blackstar Gold, Merck, MICA, CI 77499 (IRON OXIDES)

Additional particularly preferred color pigments with the trade name, Xirona®, are, for example:
Xirona Golden Sky, Merck, Silica, CI 77891 (Titanium Dioxide), Tin Oxide
Xirona Caribbean Blue, Merck, Mica, CI 77891 (Titanium Dioxide), Silica, Tin Oxide
Xirona Kiwi Rose, Merck, Silica, CI 77891 (Titanium Dioxide), Tin Oxide
Xirona Magic Mauve, Merck, Silica, CI 77891 (Titanium Dioxide), Tin Oxide.

In addition, particularly preferred color pigments with the trade name, Unipure®, are, for example:
Unipure Red LC 381 EM, Sensient CI 77491 (Iron Oxides), Silica
Unipure Black LC 989 EM, Sensient, CI 77499 (Iron Oxides), Silica
Unipure Yellow LC 182 EM, Sensient, CI 77492 (Iron Oxides), Silica In the context of a further embodiment, the applied coloring agent can also contain one or more organic pigments.

The organic pigments according to the invention are correspondingly insoluble, organic dyes or color lacquers, which may be selected, for example, from the group of nitroso, nitro, azo, xanthene, anthraquinone, isoindolinone, isoindoline, quinacridone, perinone, perylene, diketopyrrolopyrrole, indigo, thioindigo, dioxazine, and/or triarylmethane compounds.

Particularly well-suited organic pigments can for example include carmine, quinacridone, phthalocyanine, sorghum, blue pigments with the Color Index numbers, CI 42090, CI 69800, CI 69825, CI 73000, CI 74100, or CI 74160, yellow pigments with the Color Index numbers, CI 11680, CI 11710, CI 15985, CI 19140, CI 20040, CI 21100, CI 21108, CI 47000, or CI 47005, green pigments with the Color Index numbers, CI 61565, CI 61570, or CI 74260, orange pigments with the Color Index numbers, CI 11725, CI 15510, CI 45370, or CI 71105, and red pigments with the Color Index numbers, CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915, and/or CI 75470.

In another particularly preferred embodiment, a method according to the invention is characterized in that the coloring agent (F) contains at least one organic pigment (f2), wherein the organic pigment is preferably selected from the group consisting of carmine, quinacridone, phthalocyanine, sorghum, blue pigments with the Color Index numbers, CI 42090, CI 69800, CI 69825, CI 73000, CI 74100, or CI 74160, yellow pigments with the Color Index numbers, CI 11680, CI 11710, CI 15985, CI 19140, CI 20040, CI 21100, CI 21108, CI 47000, or CI 47005, green pigments with the Color Index numbers, CI 61565, CI 61570, or CI 74260, orange pigments with the Color Index numbers, CI 11725, CI 15510, CI 45370, or CI 71105, and red pigments with the Color Index numbers, CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915, and/or CI 75470.

The organic pigment can also be a color lacquer. The term, color lacquer, in the sense of the invention is understood to mean particles which comprise a layer of absorbed dyes, with the unit consisting of particles and dye being insoluble under the above-mentioned conditions. The particles may, for example, be inorganic substrates which may be aluminum, silica, calcium borosilicate, calcium aluminum borosilicate, or also aluminum.

For example, the alizarin color lacquer can be used as the color lacquer.

For the coloring of the keratin fibers, pigments of a specific shape may also be used. For example, a pigment based upon a lamellar and/or lenticular substrate platelet may be used. Furthermore, the coloring is also possible based upon a substrate platelet which comprises a vacuum-metalized pigment.

In the context of another preferred embodiment, a method according to the invention is characterized in that the coloring agent (F) contains at least one pigment (f2) selected from the group of pigments based upon a lamellar substrate platelet, pigments based upon a lenticular substrate platelet, and vacuum-metalized pigments.

The substrate platelets of this type have an average thickness of at most 50 nm, preferably less than 30 nm, and particularly preferably at most 25 nm—for example, at most 20 nm. The average thickness of the substrate platelets is at least 1 nm, preferably at least 2.5 nm, and particularly preferably at least 5 nm—for example, at least 10 nm. Preferred ranges for the thickness of the substrate platelets are 2.5 to 50 nm, 5 to 50 nm, 10 to 50 nm; 2.5 to 30 nm, 5 to 30 nm, 10 to 30 nm; 2.5 to 25 nm, 5 to 25 nm, 10 to 25 nm, 2.5 to 20 nm, 5 to 20 nm, and 10 to 20 nm. Preferably, each substrate platelet has as uniform a thickness as possible. Due to the small thickness of the substrate platelets, the pigment has a particularly high covering power.

The substrate platelets have a preferably monolithic structure. Monolithic in this context means consisting of a single self-contained unit without fractures, stratifications, or inclusions, although structural changes may, however, occur within the substrate platelets. The substrate platelets are preferably composed homogeneously, i.e., there is no concentration gradient within the platelets. In particular, the substrate platelets are not constructed in layers and have no particles distributed therein.

The size of the substrate platelet can be matched to the respective application, and in particular to the desired effect on the keratin material. In general, the substrate platelets have an average largest diameter of approximately 2 to 200 µm, and in particular approximately 5 to 100 µm.

In a preferred embodiment, the form factor (aspect ratio), expressed by the ratio of the average size to the average thickness, is at least 80, preferably at least 200, more preferably at least 500, and particularly preferably more than 750. In this case, the average size of the uncoated substrate platelets is understood to mean the d50 value of the uncoated substrate platelets. Unless stated otherwise, the d50 value was determined using a device of the Sympatec Helos type, having Quixel wet dispersion. To prepare the sample, the sample to be investigated was pre-dispersed in isopropanol for a period of 3 minutes.

The substrate platelets may be constructed from any material that can be made into the form of a platelet.

They can be of natural origin, but can also be produced synthetically. Materials from which the substrate platelets can be constructed are, for example, metals and metal alloys, metal oxides, preferably aluminum oxide, inorganic compounds, and minerals such as mica and (semi-)precious stones, as well as plastics. Preferably, the substrate platelet are made of metal (alloy)s.

Any metal suitable for metallic luster pigments is suitable as the metal. Such metals are, inter alia, iron and steel, and all air-resistant and water-resistant (semi) metals such as, for example, platinum, zinc, chromium, molybdenum, and silicon, as well as alloys thereof such as aluminum bronzes and brass. Preferred metals are aluminum, copper, silver, and gold. Preferred substrate platelets are aluminum platelets and brass platelets, substrate platelets made of aluminum being particularly preferred.

Lamellar substrate platelets are characterized by an irregularly structured edge, and are also referred to as "cornflakes" due to their appearance.

Due to their irregular structure, pigments based upon lamellar substrate platelets produce a high fraction of scattered light. In addition, the pigments based upon lamellar substrate platelets do not completely cover the existing color of a keratin material and, for example, effects can be achieved analogous to a natural graying.

Lenticular (=lens-shaped) substrate platelets have a substantially regular round edge and are also referred to as "silver dollars" due to their appearance. Due to their regular structure, the fraction of the reflected light predominates in the case of pigments based upon lenticular substrate platelets.

Vacuum-metalized pigments (VMP) can be obtained, for example, by releasing metals, metal alloys, or metal oxides from correspondingly coated films. These are characterized by a particularly small thickness of the substrate platelets in the range from 5 to 50 nm and by a particularly smooth surface having increased reflectivity. Substrate platelets which comprise a pigment metalized in a vacuum are also referred to as VMP substrate platelets in the context of this application. VMP substrate platelets of aluminum can be obtained, for example, by releasing aluminum from metalized films.

The substrate platelets made of metal or metal alloy can be passivated—for example, by anodizing (oxide layer) or chromatizing.

Uncoated lamellar, lenticular, and/or VPM substrate platelets, and in particular those made of metal or metal alloy, reflect the incident light to a high degree and produce a light-dark flop. These have proven to be particularly preferred for use in the coloring agent.

Suitable pigments based upon a lamellar substrate platelet include, for example, the pigments of the VISIONAIRE series by Eckart.

Pigments based upon a lenticular substrate platelet are available, for example, under the name, Alegrace® Gorgeous from the company Schlenk Metallic Pigments GmbH.

Pigments based upon a substrate platelet, which comprises a vacuum-metalized pigment, are available, for example, under the name, Alegrace® Marvelous or Alegrace® Aurous from the company Schlenk Metallic Pigments GmbH.

Owing to their excellent light and temperature resistance, the use of the aforementioned pigments in the method according to the invention is very particularly preferred. It is further preferred if the pigments used have a certain particle size. It is therefore advantageous according to the invention if the at least one pigment has a mean particle size $D_{50}$ of 1.0 to 50 µm, preferably 5.0 to 45 µm, preferably 10 to 40 µm, and in particular 14 to 30 µm. The mean particle size $D_{50}$ can be determined, for example, using dynamic light scattering (DLS).

The pigments (f2) are preferably used in specific quantity ranges in the coloring agent (F). The coloring agent used in the method according to the invention for coloring may contain one or more pigments—for example, in a total amount of 0.01 to 10.0 wt %, preferably 0.1 to 5.0 wt %, more preferably 0.2 to 2.5 wt %, and very particularly preferably 0.25 to 1.5 wt %. Here, the indicated amounts relate to the total amount of all pigments used, which is set in relation to the total weight of the coloring agent.

In another very particularly preferred embodiment, a method according to the invention is characterized in that the coloring agent (F) contains—relative to the total weight of the coloring agent (F)—one or more pigments (f2) in a total amount of 0.01 to 10.0 wt %, preferably 0.1 to 5.0 wt %, more preferably 0.2 to 2.5 wt %, and very particularly preferably 0.25 to 1.5 wt %.

Water Content in the Coloring Agent (F)

The coloring agent (F) described above is a ready-to-use agent which is applied to the keratin fibers. This ready-to-use agent preferably possesses a low to medium water content. It has been found that particularly those coloring agents are well-suited which contain—relative to the total weight of the agent—0.1 to 50.0 wt %, preferably 0.5 to 35.0 wt %, more preferably 1.0 to 20.0 wt %, and particularly preferably 1.5 to 15.0 wt % water.

In another explicitly very particularly preferred embodiment, a method is characterized in that the coloring agent (F) contains—relative to the total weight of the coloring agent (F)—0.1 to 50.0 wt %, preferably 0.5 to 35.0 wt %, more preferably 1.0 to 20.0 wt %, and particularly preferably 1.5 to 15.0 wt % water.

Cosmetic Carrier of Coloring Agent (F)

Due to the previously described water content of the coloring agent, which is preferably in the medium to low range, the main component of the cosmetic carrier in which the components (f1) and (f2) of the coloring agent are present is preferably non-aqueous. The cosmetic carrier is preferably a solvent and/or a polyethylene glycol. Suitable solvents that can be used are, for example, solvents from the group consisting of 1,2-propylene glycol, 1,3-propylene glycol, 1,2-butylene glycol, dipropylene glycol, ethanol, isopropanol, diethylene glycol monoethyl ether, glycerol, phenoxyethanol, and benzyl alcohol. The use of 1,2-propylene glycol is very particularly preferred.

A very particularly preferred low molecular weight polyethylene glycol is PEG-8, for example. PEG-8 comprises, on average, 8 ethylene glycol units (x1=8), has an average molecular weight of 400 g/mol, and bears the CAS number, 25322-68-3. PEG-8 is alternatively also referred to as PEG 400 and is commercially available, for example, from APS.

Additional well-suited low molecular weight polyethylene glycols are, for example, PEG-6, PEG-7, PEG-9, and PEG-10.

Another well-suited polyethylene glycol is PEG-32, for example. PEG-32 comprises 32 ethylene glycol units (x1=32), has a mean molar mass of 1,500 g/mol and bears the CAS number, 25322-68-3. PEG-32 is alternatively also referred to as PEG 1500 and can, for example, be purchased commercially from Clariant.

A very particularly well-suited polyethylene glycol with an average molecular weight is, for example, PEG 6000, which can be obtained commercially from the National Starch company (China). The molecular weight of PEG 6000 is 6,000 to 7,500 g/mol, corresponding to an x3 value of 136 to 171.

Conditioner (C)

In step (2) of the method according to the invention, the conditioner (C) is applied to the keratin fibers, and in particular human hair. The conditioner is characterized in that it contains at least one care substance (c1) selected from the group consisting of esterquat surfactants, amidoamine surfactants, quaternary imidazoline surfactants, homopolymers of diallyldimethyl ammonium chloride, copolymers of diallyldimethyl ammonium chloride, quaternized cellulose derivatives, chitosan, and derivatives of chitosan.

The care substances of group (c1) are substances whose care effect is known in principle and which are also described in the prior art as customary components for conditioners. The fact that a care substance used in the conditioner improves the hair feel can therefore be obvious to a person skilled in the art at first glance.

However, the work leading to this invention has shown that, although a greater number of care substances that are applied to the colored hair following the pigment-based coloring method improve the hair feel, they also remove or redisperse the pigments located on the hair or keratin fibers at the same time, so that the improvement in the hair feel is associated with a reduction in the color intensity in these cases.

Surprisingly, it has now been observed that the use of a conditioner (C) with the special care substances of group (c1) after the coloring step improves the hair feel without its use also leading to a weakening of the color. After application of the conditioner (C) according to the invention, the hair feels soft and natural, and was colored with the same high intensity as the hair which was not post-treated with a conditioner (C).

It has been found that the care substances with which the effect described above could be achieved belong to the group of esterquat surfactants, amidoamine surfactants, quaternary imidazoline surfactants, the homopolymers of diallyldimethyl ammonium chloride, the copolymers of diallyldimethyl ammonium chloride, the quaternized cellulose derivatives, chitosan, and the derivatives of chitosan.

The effect was particularly pronounced with conditioners that contained at least one care substance (c1) selected from the group consisting of esterquat surfactants and/or amidoamine surfactants.

A method for coloring keratin fibers, and in particular human hair, is therefore explicitly very particularly preferred, comprising (1) applying a coloring agent (F) to the keratin fibers which contains (f1) at least one amino-functionalized silicone polymer and
(f2) at least one pigment, and (2) applying a conditioner (C) to the keratin fibers which contains (c1) at least one care substance selected from the group consisting of esterquat surfactants and amidoamine surfactants, wherein the coloring agent (F) and the conditioner (C) are various formulations.

Esterquat surfactants are cationic surfactants, which are generally based upon quaternary triethanol-$C_1$-$C_6$ alkyl ammonium compounds or quaternary diethanol-di-$C_1$-$C_6$ alkyl ammonium compounds. The required long hydrocarbon chains are added as fatty acid esters, wherein the hydroxyl groups of the ammonium compounds described above are usually esterified with the carboxyl groups of fatty acids. A polyethylene unit or a poly-$C_2$-$C_6$ alkylene unit can also be located between the hydroxyl group(s) of the ammonium compound and the corresponding carboxyl group of the fatty acid.

Very particularly well-suited esterquat surfactants are compounds of the formula (T-1)

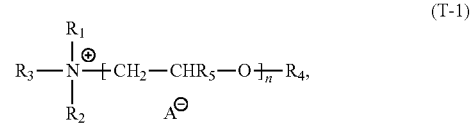

(T-1)

where $R_1$, $R_2$ represent, independently of one another, a linear or branched $C_1$-$C_{30}$ alkyl group, a linear or branched $C_2$-$C_{30}$ alkenyl group, a hydroxy-$C_2$-$C_{30}$ alkyl group, an aryl group, or an aryl-$C_1$-$C_6$ alkyl group, $R_3$ represents a linear or branched $C_1$-$C_{30}$ alkyl group, a linear or branched $C_2$-$C_{30}$ alkenyl group, a hydroxy-$C_2$-$C_{30}$ alkyl group, an aryl group, an aryl-$C_1$-$C_6$ alkyl group, or a group —$X_1$—$R_6$, $X_1$ represents a group (—$CH_2$—$CHR_7$—O)$_m$—, n represents an integer from 1 to 200, m represents an integer from 1 to 200, $R_4$, $R_6$ represent, independently of one another, a group $R_8$—C(O)—, $R_5$, $R_7$ represent, independently of one another, hydrogen, a linear $C_1$-$C_4$ alkyl group, or a hydroxyl group, $R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and $A^-$ represents a physiologically tolerated anion.

The substituents $R_1$ through $R_8$ of the compound of formula (I) are explained by way of example below: Examples of a $C_1$-$C_{30}$ alkyl group are the methyl, ethyl, propyl, isopropyl, n-butyl, s-butyl, and t-butyl, n-pentyl and n-hexyl, n-dodecyl, n-tetradecyl, n-hexadecyl, and n-octadecyl groups. Propyl, ethyl, and methyl are preferred short-chain alkyl functional groups. n-dodecyl, n-tetradecyl, n-hexadecyl, and n-octadecyl are preferred long-chain alkyl functional groups of this group. Examples of a $C_2$-$C_{30}$ alkenyl group are vinyl, allyl, but-2-enyl, but-3-enyl, and isobutenyl; preferred $C_2$-$C_6$ alkenyl functional groups are vinyl and allyl. Preferred examples of a $C_1$-$C_{30}$ hydroxyalkyl group are a hydroxymethyl, a 2-hydroxyethyl, a 2-hydroxypropyl, a 3-hydroxypropyl, a 4-hydroxybutyl group, a 5-hydroxypentyl, and a 6-hydroxyhexyl group; a 2-hydroxyethyl group is particularly preferred. Examples of an aryl group are the phenyl and the napthyl groups. Preferred examples of aryl-$C_1$-$C_6$ alkyl groups are benzyl, 1-phenylethyl, and 2-phenylethyl.

In the context of a further very particularly preferred embodiment, a method according to the invention is characterized in that the conditioner (C) contains at least one esterquat surfactant of the formula (T-1) as a care substance (c1),

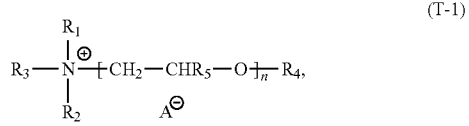

(T-1)

where
- $R_1$, $R_2$ represent, independently of one another, a linear or branched $C_1$-$C_{30}$ alkyl group, a linear or branched $C_2$-$C_{30}$ alkenyl group, a hydroxy-$C_2$-$C_{30}$ alkyl group, an aryl group, or an aryl-$C_1$-$C_6$ alkyl group,
- $R_3$ represents a linear or branched $C_1$-$C_{30}$ alkyl group, a linear or branched $C_2$-$C_{30}$ alkenyl group, a hydroxy-$C_2$-$C_{30}$ alkyl group, an aryl group, an aryl-$C_1$-$C_6$ alkyl group, or a group —$X_1$—$R_6$,
- $X_1$ represents a group (—$CH_2$—$CHR_7$—O)$_m$—,
- n represents an integer from 1 to 200,
- m represents an integer from 1 to 200,
- $R_4$, $R_6$ represent, independently of one another, a group $R_8$—C(O)—,
- $R_5$, $R_7$ represent, independently of one another, hydrogen, a linear $C_1$-$C_4$ alkyl group, or a hydroxyl group,
- $R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and
- $A^-$ represents a physiologically tolerated anion.

In the compounds of the formula (T-1), the functional groups $R_1$ and $R_2$ represent, independently of one another, a linear or branched $C_1$-$C_{30}$ alkyl group, a linear or branched $C_2$-$C_{30}$ alkenyl group, a hydroxy-$C_2$-$C_{30}$ alkyl group, an aryl group, or an aryl-$C_1$-$C_6$ alkyl group.

The functional groups R1 and R2 preferably represent, independently of one another, a linear or branched $C_1$-$C_{30}$ alkyl group or a hydroxy-$C_2$-$C_{30}$ alkyl group. Particularly preferably, the functional group R1 represents a $C_1$-$C_6$ alkyl group, and the functional group $R_2$ represents a hydroxy-$C_2$-$C_6$ alkyl group. Very particularly preferably, the functional group $R_1$ represents a methyl group or an ethyl group, and the functional group $R_2$ represents a 2-hydroxyethyl group.

In the compounds of the formula (T-1), the functional group $R_3$ represents a linear or branched $C_1$-$C_{30}$ alkyl group, a linear or branched $C_2$-$C_{30}$ alkenyl group, a hydroxy-$C_2$-$C_{30}$ alkyl group, an aryl group, an aryl-$C_1$-$C_6$ alkyl group, or a group —$X_1$—$R_6$.

Preferably, the functional group R3 represents a $C_1$-$C_{30}$ alkyl group, such as a methyl group, an ethyl group, a dodecyl group, a tetradecyl group, a hexadecyl group, or a octadecyl group, or a group —$X_1$—$R_6$. Very particularly preferably, the functional group R3 represents a group —$X_1$—$R_6$.

In the group —$X_1$—$R_6$, the functional group X1 represents in turn a group (—$CH_2$—$CHR_7$—O)$_m$—, wherein this group is oriented such that the methylene group —CH2- is adjacent to the ammonium atom in (T-1), and the oxygen atom adjoins the functional group R6.

In the compounds of the formula (T-1), the index number n represents an integer from 1 to 200. Preferably, n represents an integer from 1 to 10. Particularly preferably, n represents the number 1.

In the compounds of the formula (T-1), the index number m represents an integer from 1 to 200. Preferably, m represents an integer from 1 to 10. Particularly preferably, m represents the number 1.

The functional groups $R_4$ and $R_6$ represent, independently of one another, a group $R_8$—C(O)—, which means that the functional group $R_8$ can be selected in each group independently of the other functional groups $R_8$.

The functional groups $R_5$ and $R_7$ represent, independently of one another, hydrogen, a linear $C_1$-$C_4$ alkyl group, or a hydroxyl group. Particularly preferably, the functional group $R_5$ represents hydrogen. Likewise particularly preferably, the functional group $R_7$ represents hydrogen.

The compounds of the formula (I) can contain one or two groups $R_8$—C(O)—. If two of these groups are contained, the functional group $R_8$ of the first group can be selected independently of the functional group $R_8$ of the second group.

The functional group $R_8$ in each case independently represents a linear or branched $C_5$-$C_{29}$ alkyl group, a linear or branched $C_5$-$C_{29}$ alkenyl group, or a hydroxy-$C_5$-$C_{29}$ alkyl group.

The functional group R8 thus forms, in each case together with the carbonyl group —C(O)—, a $C_6$-$C_{30}$ alkanoyl group or the corresponding unsaturated or hydroxy-substituted $C_6$-$C_{30}$ group.

Preferably, R8 represents a $C_{11}$-$C_{21}$ alkyl group, and particularly preferably a $C_{11}$-$C_{17}$ alkyl group.

Explicitly very particularly preferably, the functional groups $R_4$ and $R_6$ both represent a stearyl group.

The functional group $A^-$ represents a physiologically tolerated anion, wherein physiologically tolerated means that the substance of the formula (T-1) can be harmlessly applied with the anion A– under physiological conditions, i.e., in the context of a cosmetic application on human skin or hair. Physiologically tolerated anions are, for example, the chloride, bromide, sulfate, carbonate, hydrogen carbonate, methyl sulfate, or the functional groups of anionic functional groups of organic acids such as maleate, fumarate, oxalate, tartrate, citrate, lactate, or acetate. In this case, anions having several negative charges are used in a correspondingly stoichiometric manner while maintaining the electroneutrality of the overall compound.

Very particularly well-suited esterquat surfactants are the compounds of the formula (T-2)

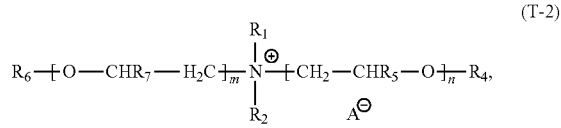

(T-2)

where
- $R_1$ represents a $C_1$-$C_6$ alkyl group,
- R2 represents a hydroxy-$C_2$-$C_6$ alkyl group,
- n represents an integer from 1 to 200, and preferably the number 1,
- m represents an integer from 1 to 200, and preferably the number 1, $R_4$, $R_6$ represent, independently of one another, a group $R_8$—C(O)—, $R_5$, $R_7$ represent, independently of one another, hydrogen, a linear $C_1$-$C_4$ alkyl group or a hydroxyl group, $R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and $A^-$ represents a physiologically tolerated anion.

In the context of a further explicitly very particularly preferred embodiment, a method according to the invention is characterized in that the conditioner (C) contains at least one esterquat surfactant of the formula (T-2) as a care substance (c1),

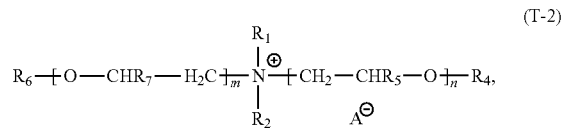

(T-2)

where $R_1$ represents a $C_1$-$C_6$ alkyl group,

R2 represents a hydroxy-$C_2$-$C_6$ alkyl group, n represents an integer from 1 to 200, and preferably the number 1, m represents an integer from 1 to 200, and preferably the number 1, $R_4$, $R_6$ represent, independently of one another, a group $R_8$—C(O)—, $R_5$, $R_7$ represent, independently of one another, hydrogen, a linear $C_1$-$C_4$ alkyl group, or a hydroxyl group, $R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and $A^-$ represents a physiologically tolerated anion.

These esterquat surfactants are sold, for example, under the brand names, Rewoquat®, Stepantex®, Dehyquart®, Armocare®, and Akypoquat®. The products, Armocare® VGH-70, Dehyquart® F-75 (INCI name: distearoylethyl hydroxyethyl-monium methosulfate), Dehyquart® C-4046, Dehyquart® L80 T (DICOCOYLETHYL HYDROXYETHYLMONIUM METHOSULFATE, PROPYLENE GLYCOL), Dehyquart® F-30 (CETEARYL ALCOHOL, DIPALMITOYLETHYL HYDROXYETHYLMONIUM METHOSULFATE), Dehyquart® AU-35, Rewoquat® WE18, Rewoquat® WE38 DPG, Stepantex® VS 90, and Akypoquat® 131 are examples of these esterquats.

The esterquat surfactants, and in particular the preferred and particularly preferred representatives described above, are preferably used in certain quantity ranges in the conditioner (C) according to the invention for optimal achievement of the object according to the invention. Particularly positive results were obtained when the conditioner (C) contained—relative to the total weight of the conditioner (C)—one or more esterquat surfactants (c1) in a total amount of 0.1 to 10.0 wt %, preferably 0.2 to 7.5 wt %, more preferably 0.3 to 5.0 wt %, and very particularly preferably 0.4 to 2.5 wt %.

In the context of another explicitly particularly preferred embodiment, a method according to the invention is characterized in that the conditioner (C)—relative to the total weight of the conditioner (C)—contains one or more esterquat surfactant (c1) in a total amount of 0.1 to 10.0 wt %, preferably 0.2 to 7.5 wt %, more preferably 0.3 to 5.0 wt %, and very particularly preferably 0.4 to 2.5 wt %.

Conditioners comprising at least one amidoamine surfactant have also led to colored hair with a very good hair feel and particularly good preservation of the color intensity when used in the coloring method according to the invention. For this reason, it is very particularly preferred in a further embodiment if the conditioner (C) contains at least one amidoamine surfactant (c1).

Surfactants which are obtained in the reaction of a fatty acid with a mono- or diamine compound are usually understood as amidoamine surfactants. For example, stearamidopropyl dimethylamine (Lexamine® S-13, Inolex Chemical Company, Philadelphia, PA, USA) is the reaction product of stearic acid (linear C18 fatty acid) with dimethylaminopropylamine. Behenamidopropyl dimethylamine (Lexamine® B-13, Inolex Chemical Company, Philadelphia, PA, USA) is accordingly the reaction product of behenic acid (linear C22 fatty acid) with dimethylaminopropylamine. Stearamide ethyl diethylamine (Lexamine® 22, Inolex Chemical Company, Philadelphia, PA, USA) is the reaction product of stearic acid (linear C18 fatty acid) with diethylaminoethylamine. Characteristic of the surfactants of the amino-amine structure type is accordingly the amide bond between the fatty acid and a first amino group and the second amino group connected to this amide bond via an optionally substituted alkyl group.

Particularly strong effects could be observed when the conditioner (C) contained at least one amidoamine surfactant of formula (T-3),

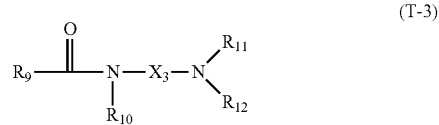

(T-3)

where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, a $C_1$-$C_4$ alkyl group, or a hydroxy-$C_1$-$C_4$ alkyl group, $X_3$ represents a $C_1$-$C_{30}$ alkylene group, and $R_{11}$, $R_{12}$ represent, independently of one another, hydrogen, a $C_1$-$C_4$ alkyl group, or a hydroxy-$C_1$-$C_4$ alkyl group.

In the context of a further very particularly preferred embodiment, a method according to the invention is characterized in that the conditioner (C) contains at least one amidoamine surfactant of formula (T-3) as a care substance (c1),

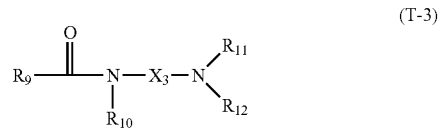

(T-3)

where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, a $C_1$-$C_4$ alkyl group, or a hydroxy-$C_1$-$C_4$ alkyl group, $X_3$ represents a $C_1$-$C_{30}$ alkylene group, and $R_{11}$, $R_{12}$ represent, independently of one another, hydrogen, a $C_1$-$C_4$ alkyl group, or a hydroxy-$C_1$-$C_4$ alkyl group.

In the amidoamine surfactants of formula (T-3), the functional group $R_9$ represents a linear or branched $C_5$-$C_{29}$ alkyl group, a linear or branched $C_5$-$C_{29}$ alkenyl group, or a hydroxy-$C_5$-$C_{29}$ alkyl group.

Together with the carbonyl group, which is adjacent to the functional group $R_9$, the group —$R_9$C(O)— thus forms $C_6$-$C_{30}$ alkanoyl group or the corresponding unsaturated or hydroxy-substituted $C_6$-$C_{30}$ group. Particularly preferably, $R_9$ represents a $C_{11}$-$C_{21}$ alkyl group, and particularly preferably a $C_{11}$-$C_{17}$ alkyl group.

The functional group $R_{10}$ represents hydrogen, a $C_1$-$C_4$ alkyl group, or a hydroxy-$C_1$-$C_4$ alkyl group. Preferably, R10 represents hydrogen.

The functional group X3 represents a $C_1$-$C_{30}$ alkylene group. A $C_1$-$C_{30}$ alkylene group is a structural group having bonds to both nitrogen atoms of the amidoamine, so that this alkylene group is also referred to as a divalent $C_1$-$C_{30}$ alkylene group, which means that each group can enter into two bonds. Examples of a linear divalent $C_1$-$C_{30}$ alkylene group are, for example, the methylene group (—CH$_2$—), the ethylene group (—CH$_2$—CH$_2$—), the propylene group (—CH$_2$—CH$_2$—CH$_2$—), and the butylene group (CH$_2$—CH$_2$—CH$_2$—CH$_2$—). The propylene group (—CH$_2$—CH$_2$—CH$_2$—) is particularly preferred. Starting at a chain length of 3 C atoms, divalent alkylene groups may also be branched. Examples of branched, divalent $C_3$-$C_{20}$ alkylene groups are (—CH$_2$—CH(CH$_3$)—) and (—CH$_2$—CH(CH$_3$)—CH$_2$—).

Particularly preferably, X3 represents an ethylene group (—CH$_2$—CH$_2$—) or a propylene group (—CH$_2$—CH$_2$—CH$_2$—).

The functional groups $R_{11}$ and $R_{12}$ represent, independently of one another, hydrogen, a $C_1$-$C_4$ alkyl group, or a hydroxy-$C_1$-$C_4$ alkyl group. Particularly preferably, both functional groups R11 and R12 represent a methyl group or an ethyl group.

Within the group of amidoamine surfactants, the compounds of the formula (T-3) are explicitly very particularly preferred,

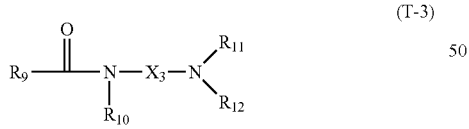

(T-3)

where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, X3 represents an ethylene group (—CH$_2$—CH$_2$—) or a propylene group (—CH$_2$—CH$_2$—CH$_2$—), and $R_{11}$, $R_{12}$ both represent a methyl group or both represent an ethyl group.

In the context of a further very particularly preferred embodiment, a method according to the invention is characterized in that the conditioner (C) contains at least one amidoamine surfactant of formula (T-3) as a surfactant (c1), where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, X3 represents an ethylene group (—CH$_2$—CH$_2$—) or a propylene group (—CH$_2$—CH$_2$—CH$_2$—), and $R_{11}$, $R_{12}$ both represent a methyl group or both represent an ethyl group.

Correspondingly very particularly preferred amidoamine surfactants of this type can be selected from the group of stearamidopropyl dimethylamine, behenic amidopropyldimethylamine, and stearamidoethyldiethylamine.

The amidoamine surfactants, and in particular the preferred and particularly preferred representatives described above, are preferably used in certain quantity ranges in the conditioner (C) according to the invention for optimally achieving the object according to the invention. Particularly positive results were obtained when the conditioner (C) contained—relative to the total weight of the conditioner (C)—one or more amidoamine surfactants (c1) in a total amount of 0.1 to 10.0 wt %, preferably 0.2 to 7.5 wt %, more preferably 0.3 to 5.0 wt %, and very particularly preferably 0.4 to 2.5 wt %.

In the context of another explicitly particularly preferred embodiment, a method according to the present invention is characterized in that the conditioner (C)—relative to the total weight of the conditioner (C)—contains one or more amidoamine surfactant (c1) in a total amount of 0.1 to 10.0 wt %, preferably 0.2 to 7.5 wt %, more preferably 0.3 to 5.0 wt %, and very particularly preferably 0.4 to 2.5 wt %.

Furthermore, it has been found to be very particularly preferred if the conditioner (C) contains both an esterquat surfactant and an amidoamine surfactant.

Conditioners (C) containing at least one quaternary imidazoline surfactant have also proven to be well suited for achieving the object of the invention.

Quaternary imidazoline surfactants are compounds of formula (T-4)

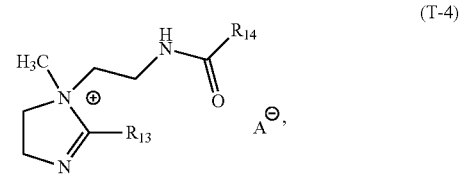

(T-4)

where

R13, R14 represent, independently of one another, a saturated or unsaturated, linear or branched hydrocarbon functional group having a chain length of 8 to 30 carbon atoms, and A$^-$ represents a physiologically tolerated anion.

The preferred compounds of the formula (T-5) contain the same hydrocarbon functional group for R13 and R14. The chain length of the functional groups R13 and R14 is preferably 12 carbon atoms. Particular preference is given to compounds having a chain length of at least 16 carbon atoms and very particularly preferably having at least 20 carbon atoms. A very particularly preferred compound of the formula I has a chain length of 21 carbon atoms. A commercial product of this chain length is known, for example, under the name, Quaternium-91. In formula (T-4), the counterion A$^-$ represents methosulfate. According to the invention, the halides such as chloride, fluoride, bromide, or also phosphates are also comprised as counterions.

The imidazolines of the formula (T-4) can be contained in the agents according to the invention in amounts of 0.01 to 20 wt %, preferably in amounts of 0.05 to 10 wt %, and very particularly preferably in amounts of 0.1 to 7.5 wt %. The very best results in this case are obtained with amounts of 0.1 to 5 wt %, in each case relative to the total composition of the particular agent.

Conditioners which contained homopolymers of diallyldimethyl ammonium chloride, copolymers of diallyldimethyl ammonium chloride, quaternized cellulose derivatives, chitosan, and/or derivatives of chitosan as care substances have proven to be well suited for achieving the object according to the invention.

A homopolymer of diallyldimethyl ammonium chloride suitable according to the invention is, for example, Merquat® 100 Poly(dimethyldiallyl ammonium chloride) (about 40% solids; INCI name: polyquaternium-6, sold by Ondeo Nalco).

Copolymers of diallyldimethyl ammonium chloride suitable according to the invention are, for example,
- Merquat® 280, a copolymer of dimethyldiallyl ammonium chloride and acrylic acid (INCI name: polyquaternium-22, approx. 35% active substance in water, sold by Ondeo-Nalco),
- Merquat® 281, a copolymer of dimethyldiallyl ammonium chloride and acrylic acid (about 39-43% solids in water; INCI name: polyquaternium-22, sold by Ondeo-Nalco),
- Merquat® 295, a copolymer of dimethyldiallyl ammonium chloride and acrylic acid (approx. 35-40 solids in water; INCI name: polyquaternium-22, sold by Ondeo-Nalco),
- Merquat® 550, a copolymer of dimethyldiallyl ammonium chloride and acrylamide (approx. 8.1-9.1% active substance in water; INCI name: polyquaternium-7, sold by Ondeo-Nalco),
- Merquat® Plus 3330, a copolymer of dimethyldiallyl ammonium chloride and acrylic acid and acrylamide (about 9.5% solids in water; INCI name: polyquaternium-39, sold by Ondeo-Nalco),
- Merquat® Plus 3330 dimethyldiallyl ammonium chloride acrylic acid acrylamide terpolymer (approx. 9.5% solids in water; INCI name: polyquaternium-39) (Ondeo-Nalco).

Cationic, i.e., quaternized, celluloses are available on the market with different degrees of substitution, cationic charge density, nitrogen content, and molecular weights. For example, polyquaternium-67 is offered commercially under the names, Polymer SL or Polymer SK (Amerchol). Further cationic celluloses are under the names, Polymer JR® 400 (Amerchol, INCI designation: polyquaternium-10) and Polymer Quatrisoft® LM-200 (Amerchol, INCI designation: polyquaternium-24). Further commercial products are the compounds, Celquat® H 100 and Celquat® L 200. Finally, a further derivatized cellulose with the INCI name, polyquaternium-72, is available under the trade name, Mirustyle® CP, from Croda with trimonium and cocodimonium hydroxyethyl cellulose. Polyquaternium-72 can be used both in solid form and already predissolved in aqueous solution. Particularly well-suited quaternized celluloses are polyquaternium-10, polyquaternium-24, polyquaternium-67, and polyquaternium-72. Polyquaternium-10 is particularly preferred within this group.

Chitosans are biopolymers and belong to the group of hydrocolloids. Considered chemically, these are partially deacetylated chitins of different molecular weight.

For the preparation of the chitosans, one starts with chitin, and preferably the shell residues of crustaceans, which are available in large amounts as cheap raw materials. The chitin is usually initially deproteinated by addition of bases, demineralized by addition of mineral acids, and finally deacetylated by addition of strong bases, wherein the molecular weights can be distributed over a broad spectrum. Such types are preferably used which have an average molecular weight of 800,000 to 1,200,000 daltons, a viscosity according to Brookfield (1 wt % in glycolic acid) below 5,000 mPas, a degree of deacetylation in the range of 80 to 88%, and an ash content of less than 0.3 wt %.

In addition to the chitosans as typical cationic biopolymers, cationically derivatized chitosans (such as quaternizing products) or alkoxylated chitosans are also possible in the sense of the invention.

As chitosan derivatives, the conditioners (C) according to the invention can, for example, contain the neutralization products of chitosan with at least one acid. The acid used for neutralization is preferably selected from organic acids, and in particular from formic acid, lactic acid, pyrrolidone carboxylic acid, nicotinic acid, acetic acid, citric acid, hydroxyisobutyric acid, hydroxyisovaleric acid, or mixtures of these acids. It is very particularly preferred here to select the acid(s) used for neutralization from lactic acid, pyrrolidone carboxylic acid, nicotinic acid, hydroxyisobutyric acid, hydroxyisovaleric acid, or mixtures of these acids.

Suitable chitosan (derivatives) are commercially available, for example, under the trade names, Hydagen® CMF (1 wt % of active substance in aqueous solution with 0.4 wt % of glycolic acid, molecular weight 500,000 to 5,000,000 g/mol Cognis), Hydagen® HCMF (chitosan (80% deacetylated), molecular weight 50,000 to 1,000,000 g/mol, Cognis), Kytamer® PC (80 wt % of active substance of chitosan pyrolidone carboxylate (INCI name: chitosan PCA), Amerchol), and Chitolam® NB/101.

The chitosan or its derivatives can be contained in the conditioner in an amount of 0.01 wt % to 20 wt %, particularly preferably 0.01 wt % to 10.0 wt %, and more particularly preferably 0.1 wt % to 1 wt %, in each case relative to the weight of the agent according to the invention.

pH of the Conditioner (C)

The pH values of the conditioner according to the invention are preferably set to an acidic to neutral pH. Very particularly preferably, the agent has a pH in the range of 2.0 to 6.5, preferably 2.5 to 6.0, further preferably 3.0 to 5.5, and quite particularly preferably 4.0 to 5.0.

In the context of another explicitly particularly preferred embodiment, a method according to the invention is characterized in that the conditioner (C)—relative to the total weight of the conditioner—contains at least 50 wt % water and has a pH of 2.0 to 6.5, preferably 2.5 to 6.0, more preferably 3.0 to 5.5, and very particularly preferably 4.0 to 5.0.

To adjust the desired pH, the conditioner can contain at least one acidifying and/or alkalizing agent. The pH values in the sense of the present invention are pH values which have been measured at a temperature of 22° C.

As alkalizing agents, for example, ammonia, alkanolamines, and/or basic

As acidifying agents, the conditioner can contain inorganic acids or organic acids such as citric acid, malic acid, tartaric acid, lactic acid, maleic acid, malonic acid, and/or benzoic acid.

Coloring Agent (F) and Conditioner (C)

In the context of the method according to the invention, a coloring agent (F) and a conditioner (C) are applied to the keratin fibers in steps (1) and (2), wherein the coloring agent (F) and the conditioner (C) are various formulations.

The coloring agent (F) and conditioner (C) are used for various purposes and also contain various ingredients due to their different intended uses. The coloring agent (F) is intended to achieve the coloring of the keratin fibers, so that the coloring agent contains the pigments (f2) responsible for the coloring. The conditioner (C) is used for the later conditioning of the keratin fibers and therefore contains the above-described care substances of group (c1).

For this reason, a coloring agent (F) according to the invention is preferably characterized in that it does not contain any care substances of group (c1). The shampoo (S) according to the invention is preferably characterized in that it does not contain any pigments. The water content of the coloring agent and the shampoo is also preferably different.

Water Content in Conditioner (C)

The conditioner (C) contains the amino-functionalized silicone polymer(s) (s1) particularly preferably in an aqueous cosmetic carrier. It has been found to be preferred if the water content in the shampoo (S)—relative to the total weight of the shampoo (S)—is in the range of 50 to 99 wt %, preferably 60 to 97 wt %, more preferably 70 to 95 wt %, and particularly preferably 75 to 93 wt %.

In a further preferred embodiment, a method according to the invention is therefore characterized in that the shampoo (S) contains—relative to the total weight of the shampoo (S)—50 to 99 wt %, preferably 60 to 97 wt %, more preferably 70 to 95 wt %, and particularly preferably 75 to 93 wt % water.

Further Optional Ingredients in the Coloring Agent (F) and/or in the Shampoo (S)

In addition to the previously described components that are essential to the invention, the coloring agent and/or the conditioner can also contain other optional ingredients, such as, for example, solvents; surfactants that are different from the previously described surfactants, anionic, non-ionic, zwitterionic, and/or cationic polymers; structurants such as glucose, maleic acid, and lactic acid, hair-conditioning compounds such as phospholipids, e.g., lecithin and cephalins; perfume oils, dimethyl isosorbide, and cyclodextrins; fiber structure-improving agents, and in particular mono-, di-, and oligosaccharides, e.g., glucose, galactose, fructose, and lactose; dyes for coloring the product; anti-dandruff active ingredients such as piroctone olamine, zinc omadine, and climbazole; amino acids and oligopeptides; animal and/or vegetable-based protein hydrolysates, as well as in the form of their fatty acid condensation products or optionally anionically- or cationically-modified derivatives; vegetable oils; light stabilizers and UV blockers; active ingredients such as panthenol, pantothenic acid, pantolactone, allantoin, pyrrolidinone carboxylic acids and their salts, and bisabolol; polyphenols, and in particular hydroxycinnamic acids, 6,7-dihydroxycoumarins, hydroxybenzoic acids, catechins, tannins, leucoanthocyanidins, anthocyanidins, flavanones, flavones, and flavonols; ceramides or pseudoceramides; vitamins, provitamins, and vitamin precursors; plant extracts; fats and waxes such as fatty alcohols, beeswax, montan wax, and kerosenes; swelling and penetrating agents such as glycerol, propylene glycol monoethyl ether, carbonates, hydrogen carbonates, guanidines, ureas, and primary, secondary, and tertiary phosphates; opacifiers such as latex, styrene/PVP, and styrene/acrylamide copolymers; pearlescent agents such as ethylene glycol mono- and distearate as well as PEG-3-distearate; and propellants such as propane-butane mixtures, $N_2O$, dimethyl ether, $CO_2$, and air.

The selection of these additional substances is made by the person skilled in the art according to the desired properties of the agents. With regard to other optional components and the amounts of said components used, reference is explicitly made to relevant handbooks known to a person skilled in the art. The additional active ingredients and auxiliaries are used in the preparations according the invention preferably always in amounts of 0.0001 to 25 wt %, and in particular of 0.0005 to 15 wt %, relative to the total weight of the particular agent.

Steps (1) and (2) of the Method

The method according to the invention comprises the application of a coloring agent (F) to the keratin fibers in step (1) and the application of a conditioner (C) to the keratin fibers in step (2).

As already described above, it is particularly preferred if the keratin fibers are first colored by applying the coloring agent (F), and then the conditioner (C) is applied. The time at which the conditioner (C) is applied depends upon the needs of the user and can be adapted to their habits.

It is particularly preferred to apply the conditioner (C) to the freshly colored, still wet or damp keratin fibers so that there is a period of only a few minutes up to a few hours between rinsing out the coloring agent (F) and applying the shampoo (S).

In a further embodiment, a method is very particularly preferred which comprises
  (1) applying the coloring agent (F) to the keratin fibers in a first step, then
  (2) applying the conditioner (C) to the keratin fibers in a second step, wherein, between steps (1) and (2), there is a period of a maximum of 72 hours, preferably a maximum of 48 hours, particularly preferably a maximum of 24 hours, and very particularly preferably a maximum of 2 hours.

A period of at most 2 hours between performance of steps (1) and (2) can mean, for example, that the coloring agent (F) is applied to the keratin fibers, acts upon the keratin fibers, and is rinsed out, and then, directly afterwards, the conditioner (C) is applied to the keratin fibers, acts upon the keratin fibers, and is rinsed out.

In another embodiment, very particular preference is given to a method comprising the following steps in the indicated order:
  (1a) applying the coloring agent (F) to keratin fibers,
  (1b) action of the coloring agent (F) on the keratin fibers,
  (1c) rinsing out the coloring agent, then, directly following step (1c),
  (2a) applying the conditioner (C) to the keratin fibers,
  (2b) action of the conditioner (C), and
  (2c) rinsing out the conditioner.

In step (1a) of the method according to the invention, a coloring agent containing at least one amino-functionalized silicone polymer and at least one pigment, and in particular the previously described preferred and particularly preferred representatives thereof, is applied to the keratinous fibers, and in particular hair.

In the subsequent step (1b), the previously applied coloring agent is left to act upon the hair. A great advantage of the coloring system according to the invention is that an intensive color result can be achieved even in very short periods after short exposure times. For this reason, it is advantageous for the coloring agent to remain on the keratin material after its application only for comparatively short periods of 30 seconds to 15 minutes, preferably 30 seconds to 10 minutes, and particularly preferably 1 to 5 minutes.

In step (1c), the coloring agent (F) is preferably rinsed or washed out of the hair, wherein the washing out preferably takes place with water without the aid of a shampoo and without using another cosmetic or surfactant formulation.

In step (2a), the conditioner (C) is then applied, wherein the application preferably takes place directly following the rinsing out of the coloring agent and thus on the still-wet or towel-moist hair.

The action of the conditioner in step (2b) can take place, for example, for a period of 10 seconds to 5 minutes.

After step (2b), the conditioner is rinsed out in step (2c). The conditioner is preferably washed out with water without the aid of a shampoo and without application of another cosmetic or surfactant formulation.

EXAMPLES

1. Formulations

The following formulations were produced (all information is in wt % unless otherwise indicated)

| Ready-to-use coloring agent (F) | F (wt %) |
| --- | --- |
| DOWSIL AP-8568 Amino Fluid (aminosilicone (f1)) | 0.75 |
| Hexamethyldisiloxane | 6.0 |
| Unipure Red LC 3079 (pigment (f2)) | 0.38 |
| Algraze Marvelous D 12/77-1 Shiny Silver (10% dispersion of the pigment) (pigment (f2)) | 2.30 |
| Water | 10.0 |
| PPG-3 benzyl ether myristate | 1.4 |
| Ucon Fluid AP (PPG-14 butyl ether) | 1.0 |
| Phenoxyethanol | 0.8 |
| 4-hydroxyacetophenone | 0.2 |
| Polyethylene glycol (PEG 6000, molar weight 6,000 g/mol) | 10.0 |
| Polyethylene glycol (PEG 400, molar weight 400 g/mol) | up to 100 |

| Conditioner (C) | C (wt %) |
| --- | --- |
| Isopropyl myristate | 2.00 |
| Dehyquart F 75 T (distearoylethyl hydroxyethylmonium methosulfate (and) cetearyl alcohol) | 1.50 |
| Stearamidopropyl dimethylamine | 0.80 |
| Cetyl palmitate | 0.70 |
| Cetearyl alcohol | 5.20 |
| Behentrimonium chloride | 2.0 |
| Guar hydroxypropyltrimonium chloride | 0.1 |
| Methylparaben | 0.3 |
| Citric acid/sodium hydroxide | up to pH 4.6 |
| Phenoxyethanol | 0.4 |
| Polydimethylsiloxane 60000 cSt | 0.5 |
| Dehyquart A-CA (cetrimonium chloride (and) water) | 0.50 |
| Perfume | 0.50 |
| Crodarom Black Pearl (aqua (water), glycerol, hydrolyzed pearl) | 0.20 |
| Nutrilan Keratin W PP (hydrolyzed keratin) | 0.60 |
| Argania Spinosa Shell Powder (Argan Exfoliator 500) | 0.50 |
| Water (distilled) | up to 100 |

2. Application

The ready-to-use coloring agent F was applied to hair strands (Kerling, type "European-hair white" (ENH)) (liquor ratio: 1 g agent per 1 g of hair strand) and allowed to act for three minutes. Subsequently, the hair strands were washed thoroughly (1 minute) with water. Directly thereafter, the conditioner (C) was applied to the freshly colored, still-moist strand (liquor ratio 0.5 g of conditioner per 1 g of hair). The conditioner was allowed to act for three minutes and then rinsed out with water.

A comparative strand was not further treated after the coloring step and dried.

3. Assessment of the Tactile Sensation

The tactile sensation of the dry hair was assessed by trained individuals. The color intensity of the colored strands was visually evaluated under a daylight lamp.

| | Hair feel result | Color intensity |
| --- | --- | --- |
| Comparison of the application of the coloring agent (F) without post-treatment with conditioner | Individual hair fibers stick together and cannot be styled like natural hair, sticky hair feel | +++ |
| Invention: application of the coloring agent (F) followed by application of the conditioner (C) | Individual hair fibers separated and can be styled well; natural, soft hair feel | +++ |

Color intensity: + = weak ++ = moderate +++ = very high

By successively applying the coloring agent (F) according to the invention and the conditioner (C), the hair feel was massively improved compared to the coloring of the hair without post-treatment. The method according to the invention enabled intense color results without losses with regard to the color intensity.

What is claimed is:

1. A method for coloring keratin fibers, comprising
   (1) applying a coloring agent (F) to the keratin fibers, said coloring agent (F) comprising
      (f1) at least one amino-functionalized silicone polymer and
      (f2) at least one pigment, and
   (2) applying a conditioner (C) to the keratin fibers, said conditioner (C) comprising (c1) at least one care substance selected from the group consisting of esterquat surfactants, amidoamine surfactants, quaternary imidazoline surfactants, homopolymers of diallyldimethyl ammonium chloride, copolymers of diallyldimethyl ammonium chloride, quaternized cellulose derivatives, chitosan, and derivatives of chitosan,
   wherein the coloring agent (F) and the conditioner (C) are different formulations.

2. The method according to claim 1, wherein the coloring agent (F) includes at least one amino-functionalized silicone polymer (f1) which comprises at least one structural unit of the formula (Si-amino),

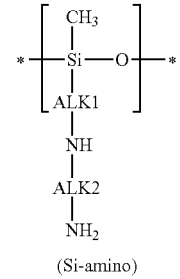

(Si-amino)

where ALK1 and ALK2 represent, independently of one another, a linear or branched, divalent $C_1$-$C_{20}$ alkylene group.

3. The method according to claim 1, wherein the coloring agent (F) includes at least one amino-functionalized silicone polymer (f1) comprising structural units of the formula (Si-I) and of the formula (Si-II)

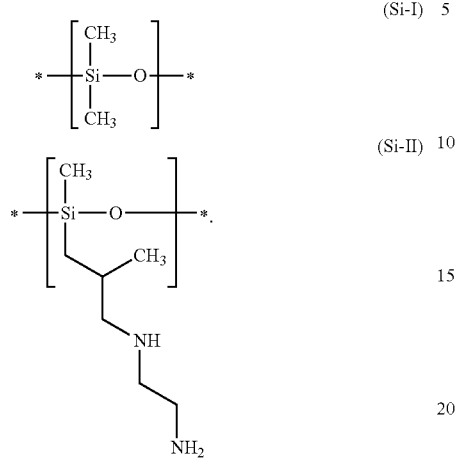

4. The method according to claim 1, wherein, relative to the total weight of the coloring agent (F)—the one or more amino-functionalized silicone polymers (f1) is present in a total amount of 0.1 to 20 wt %.

5. The method according to claim 1, wherein, relative to the total weight of the coloring agent (F)—the one or more amino-functionalized silicone polymers (f1) is present in a total amount of 0.5 to 2.0 wt %.

6. The method according to claim 1, at least one pigment (f2) is an inorganic pigment, wherein the inorganic pigment is selected from the group consisting of colored metal oxides, metal hydroxides, metal oxide hydrates, silicates, metal sulfides, complex metal cyanides, metal sulphates, bronze pigments, and mica-based colored pigments which are coated with at least one metal oxide and/or metal oxychloride.

7. The method according to claim 1, wherein the coloring agent (F) contains at least one organic pigment (f2), wherein the organic pigment is selected from the group of carmine, quinacridone, phthalocyanine, sorghum, blue pigments having the Color Index Numbers, CI 42090, CI 69800, CI 69825, CI 73000, CI 74100, CI 74160, yellow pigments having the Color Index Numbers, CI 11680, CI 11710, CI 15985, CI 19140, CI 20040, CI 21100, CI 21108, CI 47000, CI 47005, green pigments having the Color Index Numbers, CI 61565, CI 61570, CI 74260, orange pigments having the Color Index Numbers, CI 11725, CI 15510, CI 45370, CI 71105, and red pigments having the Color Index Numbers, CI 12085, CI 12120, CI 12370, CI 12420, CI 12490, CI 14700, CI 15525, CI 15580, CI 15620, CI 15630, CI 15800, CI 15850, CI 15865, CI 15880, CI 17200, CI 26100, CI 45380, CI 45410, CI 58000, CI 73360, CI 73915, CI 75470.

8. The method according claim 1, wherein the coloring agent (F) includes at the least one pigment (f2) is selected from the group consisting of: pigments based upon a lamellar substrate platelet, pigments based upon a lenticular substrate platelet, and vacuum-metallized pigments.

9. The method according to claim 1, wherein the coloring agent (F) includes water in an amount of 0.1 to 50.0 wt %, relative to the total weight of the coloring agent (F).

10. The method according to claim 1, wherein the coloring agent (F) includes water in an amount of 1.5 to 15.0 wt %, relative to the total weight of the coloring agent (F).

11. The method according to claim 1, wherein the conditioner (C) includes at least one esterquat surfactant of the formula (T-1) as a care substance (c1),

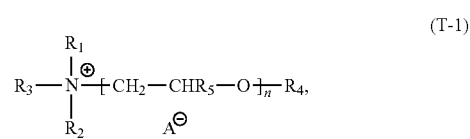

where
$R_1$, $R_2$ represent, independently of one another, a linear or branched $C_1$-$C_{30}$ alkyl group, a linear or branched $C_2$-$C_{30}$ alkenyl group, a hydroxy-$C_2$-$C_{30}$ alkyl group, an aryl group, or an aryl-$C_1$-$C_6$ alkyl group,
$R_3$ represents a linear or branched $C_1$-$C_{30}$ alkyl group, a linear or branched $C_2$-$C_{30}$ alkenyl group, a hydroxy-$C_2$-$C_{30}$ alkyl group, an aryl group, an aryl-$C_1$-$C_6$ alkyl group, or a group —$X_1$—$R_6$,
$X_1$ represents a group (—$CH_2$—$CHR_7$—$O$)$_m$—,
n represents an integer from 1 to 200,
m represents an integer from 1 to 200,
$R_4$, $R_6$ represent, independently of one another, a group $R_8$—C(O)—,
$R_5$, $R_7$ represent, independently of one another, hydrogen, a linear $C_1$-$C_4$ alkyl group, or a hydroxyl group,
$R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and
$A^-$ represents a physiologically tolerated anion.

12. The method according to claim 1, wherein the conditioner (C) contains at least one esterquat surfactant of the formula (T-2) as a care substance (c1),

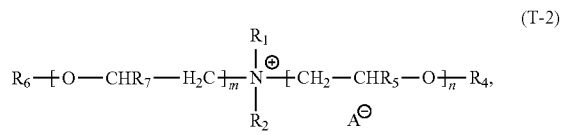

where
$R_1$ represents a $C_1$-$C_6$ alkyl group,
R2 represents a hydroxy-$C_2$-$C_6$ alkyl group,
n represents an integer from 1 to 200,
m represents an integer from 1 to 200,
$R_4$, $R_6$ represent, independently of one another, a group $R_8$—C(O)—,
$R_5$, $R_7$ represent, independently of one another, hydrogen, a linear $C_1$-$C_4$ alkyl group, or a hydroxyl group,
$R_8$ represents, in each case independently, a linear or branched $C_5$-$C_{29}$ alkyl group, a linear or branched $C_5$-$C_{29}$ alkenyl group, or a hydroxy-$C_5$-$C_{29}$ alkyl group, and
$A^-$ represents a physiologically tolerated anion.

13. The method according to claim 1, wherein the conditioner (C) includes one or more esterquat surfactants (c1) in a total amount of 0.1 to 10 wt %, relative to the total weight of the conditioner (C).

14. The method according to claim 1, wherein the conditioner (C) includes one or more esterquat surfactants (c1) in a total amount of 0.4 to 2.5 wt %, relative to the total weight of the conditioner (C).

15. The method according to claim 1, wherein the conditioner (C) includes at least one amidoamine surfactant of the formula (T-3) as a care substance (c1),

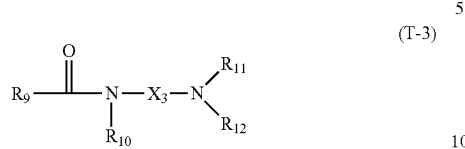
(T-3)

where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, a $C_1$-$C_4$ alkyl group, or a $C_1$-$C_4$ alkyl group, $X_3$ represents a $C_1$-$C_{30}$ alkylene group, and $R_{11}$, $R_{12}$ represent, independently of one another, hydrogen, a $C_1$-$C_4$ alkyl group, or a hydroxy-$C_1$-$C_4$ alkyl group.

16. The method according to claim 1, wherein the conditioner (C) includes at least one amidoamine of the formula (T-3) as a care substance (c1), where $R_9$ represents a linear or branched $C_5$-$C_{29}$ alkyl group, a linear or branched $C_5$-$C_{29}$ alkenyl group, or a linear or branched hydroxy-$C_5$-$C_{29}$ alkyl group, $R_{10}$ represents hydrogen, $X_3$ represents an ethylene group (—$CH_2$—$CH_2$—) or a propylene group (—$CH_2$—CH2-$CH_2$—), and $R_{11}$, $R_{12}$ both represent a methyl group or both represent an ethyl group.

17. The method according to claim 1, wherein the conditioner (C) includes one or more amidoamine surfactant (c1) in a total amount of 0.1 to 10 wt %, relative to the total weight of the conditioner (C).

18. The method according to claim 1, wherein the conditioner (C) includes one or more amidoamine surfactant (c1) in a total amount of 0.4 to 2.5 wt %, relative to the total weight of the conditioner (C).

19. The method according to claim 1, wherein the conditioner (C) includes at least 50% water, relative to the total weight of the conditioner, and has a pH in the range of 2.0 to 6.5.

20. The method according to claim 1, comprising
(1) applying the coloring agent (F) to the keratin fibers in a first step, then
(2) applying the conditioner (C) to the keratin fibers in a second step,
wherein, between steps (1) and (2), there is a period of a maximum of 72 hours.

* * * * *